United States Patent

Saito

(10) Patent No.: US 8,232,331 B2
(45) Date of Patent: *Jul. 31, 2012

(54) NONAQUEOUS INK, INK SET, IMAGE-FORMING METHOD, IMAGE-FORMING APPARATUS AND RECORDED ARTICLE

(75) Inventor: Ryo Saito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 17 days.

This patent is subject to a terminal disclaimer.

(21) Appl. No.: 12/750,751

(22) Filed: Mar. 31, 2010

(65) Prior Publication Data

US 2010/0247772 A1    Sep. 30, 2010

(30) Foreign Application Priority Data

Mar. 31, 2009  (JP) ................................. 2009-088229

(51) Int. Cl.
  *C09D 11/10*  (2006.01)

(52) U.S. Cl. ..................... 523/160; 428/195.1; 428/207; 427/466

(58) Field of Classification Search .................. None
See application file for complete search history.

(56) References Cited

U.S. PATENT DOCUMENTS

2009/0085017 A1 * 4/2009 Nemoto ........................ 252/586
2010/0196680 A1 * 8/2010 Saito ............................ 428/207

FOREIGN PATENT DOCUMENTS

| EP | 1 500 688 A1 | 1/2005 |
| EP | 1892573 A1 | 2/2008 |
| JP | 2002-188025 A | 7/2002 |
| JP | 2003-113341 A | 4/2003 |
| JP | 2003-128955 A | 5/2003 |
| JP | 2005-179506 A | 7/2005 |
| WO | 2008/081996 A2 | 7/2008 |

OTHER PUBLICATIONS

"The Porphyrin Handbook: Applications of Phthalocyanines" edited by Kadish et al., published by Elsevier 2003, pp. 129 & 130.*

* cited by examiner

*Primary Examiner* — James J Seidleck
*Assistant Examiner* — Vu A Nguyen
(74) *Attorney, Agent, or Firm* — Sughrue Mion, PLLC

(57) ABSTRACT

A nonaqueous ink, having: colorant particles, the colorant particles having an average particle diameter of 1 nm or more and less than 50 nm, and the value ($D_{90}-D_{10}$) of being 100 nm or less, a dispersant; and a cationically-polymerizable compound; wherein $D_{90}-D_{10}$ is a value obtained by subtracting $D_{10}$ from $D_{90}$; $D_{90}$ and $D_{10}$ represent respectively the particle diameters at cumulative colorant particle numbers of 0.9 (90 number %) and 0.1 (10 number %) in an integral value of the distribution function $dG=F(D)dD$; and G represents the number of the pigment particles; and D represents the diameter of the particles.

14 Claims, No Drawings

NONAQUEOUS INK, INK SET, IMAGE-FORMING METHOD, IMAGE-FORMING APPARATUS AND RECORDED ARTICLE

FIELD OF THE INVENTION

The present invention relates to a nonaqueous ink, an ink set, an image-forming method, an image-forming apparatus and a recorded article.

BACKGROUND OF THE INVENTION

Inkjet recording process has been in rapid progress in various fields, because high-definition images can be recorded in a relatively simple apparatus. Applications of such process have also been diversified, and thus various recording media or inks suitable for respective applications are selected. In recent years, application of the inkjet recording process to industrial fields is under study, and in particular, the development is advanced to provide printers having performances satisfying the requirements of an on-demand type application of carrying out facilitated printing.

The process and the ink used for recording are also studied from various points. For example, an inkjet recording inks, that are hardened when they are exposed to an ultraviolet ray, are in development. Such an ink has a significantly shortened image-fixing period and improved fixing efficiency, compared to inks that should be air-dried or left for penetration into the substrate. However, there is still a need for further improvement of hardening velocity and reduction of hardening energy. It is important in industrial application that the image is brilliant and highly vivid, and also, that a great number of prints are formed in an extremely short period of time at low energy consumption.

As to the UV-hardening inks as described above, hardening inks using a cationically-polymerizable compound mainly based on acrylic compositions are studied (see e.g., JP-A-2002-188025 ("JP-A" means unexamined published Japanese patent application) and JP-A-2005-179506). Further, reduction in the size of pigment particles contained in an ink is attempted for improvement of image brilliance. However, JP-A-2002-188025 does not disclose the diameter of the pigment particles used in practice, and the diameter of the particles is 120 nm or more, even if the smallest one, for example, specifically disclosed in JP-A-2005-179506.

On the other hand, as an aqueous ink which does not demand hardening by ultraviolet ray or the like, it is disclosed that an ink containing pigment particles made in a smaller diameter and in a narrower particle diameter distribution for improving a bronzing property, a glossiness property, and others (see, e.g., JP-A-2003-113341 and JP-A-2003-128955). When used in such an aqueous ink, for example, the pigment fine particles having a particle diameter of 30 nm or less, as disclosed in the Patent Documents above, can be utilized in a stabilized state. However, it is not obvious whether such a nonaqueous hardening ink can show favorable ink properties, while preserving its resistance properties such as a light resistance and a heat resistance sufficiently, to be used as an ink which is fixed to be an image by irradiation of an activating energy ray such as ultraviolet ray or by heating. Furthermore, when the pigment fine particles are applied to a nonaqueous ink, it is not obvious whether or not the pigment fine particles can be dispersed in the ink medium thereof, while keeping the organic pigment fine particles fine.

Considering the requirements in industrial application, particularly the extremely severe requirements demanded recently for nonaqueous inks, conventional inks are still unsatisfactory. For example, further improvement of ink hardening velocity, hardening efficiency, and the like by photoirradiation is desired. In addition, pulverization of pigment fine particles for improvement in transparency was accompanied by a problem of deterioration in light resistance. Thus, it was difficult to obtain inks favorable in both of the transparency and the light resistance.

SUMMARY OF THE INVENTION

The present invention resides in a nonaqueous ink, having:
colorant particles, the colorant particles having an average particle diameter of 1 nm or more and less than 50 nm, and the value ($D_{90}$–$D_{10}$) of being 100 nm or less,
a dispersant; and
a cationically-polymerizable compound;
wherein $D_{90}$–$D_{10}$ is a value obtained by subtracting $D_{10}$ from $D_{90}$; $D_{90}$ and $D_{10}$ represent respectively the particle diameters at cumulative colorant particle numbers of 0.9 (90 number %) and 0.1 (10 number %) in an integral value of the distribution function dG=F(D)dD; and G represents the number of the pigment particles; and D represents the diameter of the particles.

Further, the present invention resides in an image-forming method, having: a step of recording an image by using the ink as described above.

Further, the present invention resides in an image-forming apparatus having a means that can record an image by using the ink as described above.

Further, the present invention resides in a method of producing a nonaqueous ink, the nonaqueous ink containing a dispersant and, a cationically-polymerizable compound, having the steps of:
providing a colorant solution and an aqueous medium, in which a dispersant is contained in at least one of the colorant solution and the aqueous medium;
bringing the colorant solution and the aqueous medium into contact each other, and thereby precipitating the colorant as fine particles;
removing the fine particles in an agglomerate form, and
bringing the removed colorant agglomerates into contact with an organic medium.

Other and further features and advantages of the invention will appear more fully from the following description.

DETAILED DESCRIPTION OF THE INVENTION

According to the present invention, there is provided the following means:
(1) A nonaqueous ink, having:
colorant particles, the colorant particles having an average particle diameter of 1 nm or more and less than 50 nm, and the value ($D_{90}$–$D_{10}$) of being 100 nm or less,
a dispersant; and
a cationically-polymerizable compound;
wherein $D_{90}$–$D_{10}$ is a value obtained by subtracting $D_{10}$ from $D_{90}$; $D_{90}$ and $D_{10}$ represent respectively the particle diameters at cumulative colorant particle numbers of 0.9 (90 number %) and 0.1 (10 number %) in an integral value of the distribution function dG=F(D)dD; and G represents the number of the pigment particles; and D represents the diameter of the particles.
(2) The nonaqueous ink as described in the above item (1), wherein the colorant particle has a crystalline structure.
(3) The nonaqueous ink as described in the above item (1) or (2), wherein the dispersant is a polymer compound.

(4) The nonaqueous ink as described in any one of the above items (1) to (3), further having a cationic polymerization initiator.

(5) The nonaqueous ink as described in any one of the above items (1) to (4), wherein the cationically-polymerizable compound is at least one cationically-polymerizable compound selected from the group consisting of an oxetane compound, an oxirane compound and a vinyl ether compound.

(6) The nonaqueous ink as described in any one of the above items (1) to (5), wherein the nonaqueous ink is an inkjet recording ink.

(7) An ink set comprising a plurality of inks, wherein at least one of the inks is the ink according to any on of items (1) to (6).

(8) An image-forming method, comprising: a step of recording an image by using the nonaqueous ink according to any one of items (1) to (6) or the ink set of item (7).

(9) An image-forming apparatus, comprising a means that can record an image by using the nonaqueous ink according to any one of items (1) to (6) or the ink set of item (7).

(10) A method of producing a nonaqueous ink, the nonaqueous ink containing a dispersant and, a cationically-polymerizable compound, comprising the steps of:

providing a colorant solution and an aqueous medium, in which a dispersant is contained in at least one of the colorant solution and the aqueous medium;

bringing the colorant solution and the aqueous medium into contact each other, and thereby precipitating the colorant as fine particles;

removing the fine particles in an agglomerate form, and bringing the removed colorant agglomerates into contact with an organic medium.

(11) The method according to item (10), wherein the colorant fine particles are precipitated in the following condition A or B.

A: The colorant solution is introduced via a supplying tube into the stirred aqueous medium.

B: The colorant solution and the aqueous medium are contacted in the term of passing a channel.

(12) The method according to item (10) or (11), wherein the agglomerates are formed by treating the precipitated fine particles with acid.

The nonaqueous ink (hereinafter, also referred to simply as "ink") according to the present invention is preferably an ink composition, containing colorant particles, a dispersant and a cationically-polymerizable compound. Further, the ink composition can probably harden by irradiation of activating energy ray. The "activating energy ray", as used in the present invention, is not particularly limited, and may be any radiation ray that can impart energy for generation of initiators in the composition by irradiation thereof. Examples of the activating energy ray widely include α-ray, γ-ray, X-ray, ultraviolet ray (UV), visible ray, electron beam and the like; and among them, ultraviolet ray and electron beam are preferable, and ultraviolet ray is particularly preferable, from the viewpoint of hardening sensitivity and availability of devices. Thus, the nonaqueous ink according to the present invention is preferably an ink that can harden by irradiation of ultraviolet ray as a radiation ray.

The nonaqueous ink according to the present invention contains colorant particles, a dispersant, and a cationically-polymerizable compound, and the average particle diameter of the colorant particles is 1 nm or more and less than 50 nm, and the following value ($D_{90}-D_{10}$) is 100 nm or less.

[$D_{90}-D_{10}$ is a value obtained by subtracting $D_{10}$ from $D_{90}$; $D_{90}$ and $D_{10}$ represent respectively the particle diameters at cumulative colorant particle numbers of 0.9 (90 number %) and 0.1 (10 number %) in an integral value of the distribution function $dG=F(D)dD$; and G represents the number of the pigment particles; and D represents the diameter of the particles.]

In the nonaqueous ink according to the present invention, when the average particle diameter of the colorant particles is in the particular range above and the polydispersity index is less or equal to the particular numerical value, the ink is higher in the hardening velocity by crosslinking bond caused by an activating energy ray. Thereby, an image higher in transparency can be formed. In addition, combined use of the ink according to the present invention with other multiple inks gives an ink excellent in hardening efficiency and drastically higher in hardening velocity, which in turn gives a high-definition recorded article excellent in tint.

The reason for this may be, for example, the followings, although the reason is not yet to be clearly understood: Reduction in size of the colorant particles contained in an ink leads to decrease of the light-scattering component derived from the colorant particles and thus to increase of the ink transparency. It can be thought that this way reduces scattering of an activating energy ray used during image formation and uses the energy more efficiently for crosslinking and hardening of the ink. In particular, the colorant particles according to the present invention absorbs light very slightly in low wavelength region, as compared to conventional colorant particles, and thus, it can be thought that the energy of the activating ray can be more efficiently used for crosslinking and hardening of the ink.

When multiple inks are used for recording, because consumption of the activating ray energy and the amount of the scattering component are reduced in the ink according to the present invention containing colorant particles having the average particle diameter of 1 nm or more and less than 50 nm, the energy is transmitted to the other inks efficiently. As a result, it can be considered that, in a case where the ink according to the present invention is used in combination with multiple inks in an ink set (the ink set preferably being in combination of different color inks), the ink set will be excellent in hardening velocity and hardening efficiency. The average particle diameter in the present invention means an average particle diameter determined by the following dynamic light-scattering method, unless specified otherwise, and measured by using FPAR-1000 (trade name) manufactured by Otsuka Electronics Co., Ltd. The average particle diameter of the colorant particles is more preferably 1 to 40 nm, from the viewpoint of improving ink hardening velocity when an activating ray is irradiated, and particularly preferably 1 to 30 nm from the viewpoint of further improving hardening velocity of the ink and improving transparency of the resulting recorded article.

If the average particle diameter is in the range above, the recorded article hardens very rapidly when activating ray is irradiated, giving an image higher in transparency. If the ink is used in combination with multiple inks, further distinctive improvement in hardening efficiency is exhibited, giving a recorded article higher in fixing efficiency and abrasion resistance. Further, if the average particle diameter is below the range above, it is difficult to keep the dispersion state of the particles in the ink stabilized for a long period of time. It also leads to deterioration in light resistance. On the other hand, if it is above the range, it is not possible to obtain a recorded article excellent in transparency, and the hardening velocity and hardening efficiency of the ink decrease.

[Average Particle Diameter According to a Dynamic Light-Scattering Method]

In the present invention, unless otherwise stated, the dispersion state of the colorant may be also evaluated according to the dynamic light-scattering method as described above. Thereby, an average particle diameter of the colorant particle can be calculated. The principle of evaluation is detailed below. Particles with the size ranging from about 1 nm to about 5 μm are momentarily changing their position and direction in Brownian motion such as translation and rotation. Accordingly, by irradiating a laser light to these particles and then detecting the resultant scattered light, fluctuation of the scattered light intensity depending on Brownian motion is observed. By observing the fluctuation of the scattered light intensity with respect to time of period, a speed (diffusion coefficient) of the particles in Brownian motion is calculated and the size of the particles can be known.

[Average Particle Diameter from Observation by Transmission Electron Microscope]

In the present invention, a form of colorant particles contained in an ink is observed by using a transmission electron microscope (TEM). An average particle diameter of the colorant particle contained in the ink is calculated as described below.

The ink containing colorant particles is diluted. The diluted dispersion is dropped onto a Cu 200 mesh to which a carbon film is attached, and then the fine particles are dried on the mesh. The diameter of each of 300 particles is measured from images of the particles photographed to 100,000 times using TEM (1200EX, trade name, manufactured by JEOL Ltd.), and then an average particle diameter is calculated.

At this time, because the ink is dried on the Cu 200 mesh as described above, even the colorant particles are in a state well dispersed in the ink, there is a case where the colorant particles apparently aggregate during the dry step, which makes it difficult to discriminate an accurate particle size. In this case, an average particle diameter is calculated by using isolated 300 particles that are not piled on other particles. When the colorants are not spherical, the width of the particle cross section (the longest size of the particle) is measured.

In the present invention, the arithmetic average particle diameter of the colorant particles in a dispersion medium, as determined by the dynamic light-scattering method, is preferably in the range of ±20 nm, more preferably in the range of ±15 nm, and still more preferably in the range of ±10 nm, to the average particle diameter determined by TEM observation. If it is in the range above, the colorant particles are well dispersed in the dispersion medium, and the advantageous effects of the present invention are exhibited sufficiently.

(Monodispersity of Colorant Particles)

In the present invention, a particle diameter distribution of the colorant particles dispersed in a dispersion medium is preferably monodispersion (narrow particle diameter distribution of the particles). When the colorant particles contained in an ink is in the monodispersion state, it is possible to reduce influences such as light scattering caused by particles having a larger particle diameter, and use of such colorant particles is also advantageous in controlling filling state of aggregate formed by aggregation, for example, when printing or recording is made by aggregation using the ink. For example, the difference ($D_{90}$–$D_{10}$) between the particle diameter ($D_{90}$) occupying 90 number % of the total number of colorant particles and the particle diameter ($D_{10}$) occupying 10 number % of the total number of colorant particles, in the arithmetic average particle diameter as determined by dynamic light scattering method, can be used as an indicator for evaluation of ink dispersibility. In the relationship above, the difference between $D_{90}$ and $D_{10}$ is closer to zero when the particle diameter distribution is narrower, while the difference between $D_{90}$ and $D_{10}$ is larger when the particle diameter distribution is broader, i.e., the polydispersity is larger.

In the present invention, the difference between $D_{90}$ and $D_{10}$ is 100 nm or less, from the viewpoint of reduction of the scattering component in printed area and increase of transparency. Further, the difference is more preferably 1 to 70 nm from the viewpoint of improvement in hardening velocity and hardening efficiency of the ink and particularly preferably 1 to 50 nm from the viewpoint of improvement of brilliant color development and printing concentration of secondary and tertiary colors and abrasion resistance.

In particular, since the monodispersity of colorant particles described above largely contributes to reduce an absorption of radiation ray (light) in the low wavelength side of the colorant particles and the hardening velocity is very higher when the difference between $D_{90}$ and $D_{10}$ is in the range above. When the difference between $D_{90}$ and $D_{10}$ is more than the upper limit value, the scattering component in the ink solution is increased, leading to deterioration in hardening velocity and hardening efficiency of a recorded article. In the present invention, as a result of combining that the monodispersity of the colorant particles is in the range above and that the average particle diameter of the colorant particles is 1 nm or more and less than 50 nm, it is possible to obtain particularly distinctive improvement in the well transparency and the ink hardening velocity described above.

In the present invention, the phrase "the colorant particle has a crystalline structure" means that when the colorant particle in an ink is subjected to a powder X-ray diffraction analysis, the results of analysis do not meet any one of the following (i) and (ii):

(i) a halo that is specific to amorphous (non-crystalline) substance is observed, (ii) the crystallite diameter that is determined by the measuring method described below is less than 2 nm (20 Å), or the substance is supposed to be amorphous.

In the present invention, the crystallite diameter is measured and calculated as follows:

First, X-ray diffraction analysis is performed by using Cu—Kα1 ray. Thereafter, in the range 2θ of 4 deg to 70 deg, a half width of the peak that shows the maximum intensity, or the peak that shows a sufficiently large intensity to be able to separate from a peak adjacent thereto, is measured. Then, the crystallite diameter is calculated according to the following Scherrer's equation:

$$D = K \times \lambda / (\beta \times \cos \theta)$$

wherein, D represents a crystallite diameter (m, a size of crystallite), λ represents a measuring X-ray wavelength (nm), β represents an extent (radian) of a diffraction line dependent on a diameter of the crystal, θ represents a Bragg angle (radian) of the diffraction line, and K represents a constant which is variable depending on the constant of β and the constant of equipment to be used.

Generally, it is known that when a half width β/2 is used in place of β, K equals 0.9. Further, since the wavelength of Cu—Kα1 ray is 0.154050 nm (1.54050 Å), the crystallite diameter D in the present invention is calculated according to the following equation:

$$D = 0.9 \times 0.154050 / (\beta/2 \times \cos \theta)$$

Herein, in a case where a half width of the peak cannot be determined since a peak of the spectrum obtained by the measurement is broad, it is assumed that the crystallite diameter is less than 2 nm (20 Å) (a fine crystalline state), or an amorphous state (non-crystalline).

In the ink according to the present invention, the crystallite diameter of the colorant particles contained in the ink, as calculated by the method above, is preferably 0.9 nm (9 Å) or more from the viewpoint of improvement in light resistance, more preferably 5 nm (50 Å) or more and particularly preferably 8 nm (80 Å) or more from the viewpoint of further improvement in light resistance and preservation of transparency. The upper limit of the crystallite diameter is not larger than the average particle diameter calculated by TEM observation (or SEM observation).

When a cation-polymerization-type ink has a large amount of amorphous portions, the storage stability thereof may deteriorate in the cation-polymerization-type ink since the crystal state of the colorant particles is thermodynamically instable.

As for the ink according to the present invention, the amount of bulky (gross) particles or balky secondary aggregates (aggregates of primary particles) contained in each ink are preferably small. The number of the colorant particles having a particle diameter of 0.8 μm or more in the colorant particles contained in each ink is $1.2 \times 10^7$ number/ml or less, preferably $1.0 \times 10^7$ number/ml or less from the viewpoint of abrasion resistance and particularly preferably $0.8 \times 10^7$ number/ml or less from the viewpoint of improvement of ejecting stability and hardening velocity.

In the present invention, an average diameter and a value represented by $(D_{90}-D_{10})$ are values measured by the methods described in the Examples described below, unless specified otherwise. The number of the colorant particles having a particle diameter of 0.8 μm or more is determined by counting the number of bulky particles having a particle diameter of 0.8 μm or more in a given area of a film formed to a thickness of 3 μm by bar coating of an ink under an optical microscope at a magnification of 5,000 times and converting the number to a number per 1 ml of the ink. The average particle diameter of the colorant particles in the present invention can be controlled by selecting kinds of pigment and dispersant, and dispersion condition, and the number of the bulky particles can be controlled properly by filtration conditions (for example, selection of a filter, and multi-stage filtration, presence or absence of centrifugation, or the like).

In addition, the nonaqueous ink according to the present invention allows drastic reduction of the amount of a filler used in forming aggregates, for example, for printing, recording by using the ink, and also diversification of choice thereof and is thus more advantageous than conventional inks. The ink also shows a clear transparent brilliant color characteristic of nanometer-sized colorant particles. The ink that satisfies the current high requirement level can be favorably used as a colorant for cutting-edge precision image-related devices such as a color filter, or a high-performance inkjet ink.

The colorant constituting the colorant particles used in the present invention is not particularly limited and may be suitably selected according to application. The organic pigment used as a colorant may include, for example, an azo pigment, a polycyclic pigment, a chelate dye, a nitro pigment, a nitroso pigment, and an aniline black. Among these, an azo pigment, a polycyclic pigment and the like are preferable.

Examples of the azo pigment may include an azo lake pigment, an insoluble azo pigment, a condensed azo pigment, and a chelate azo pigment. Examples of the polycyclic pigment includes a phthalocyanine pigment, a perylene pigment, a perynone pigment, an anthraquinone pigment, a quinacridone pigment, a dioxazine pigment, a indigo pigment, a thioindigo pigment, an isoindolinone pigment, and a quinophthalone pigment. Examples of the chelate dye may include a basic dye-based chelate, and an acidic dye-based chelate.

As for yellow ink pigments of the organic pigments, the pigment may be C.I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155, 180, or the like. Among them, C.I. Pigment Yellow 74 is particularly preferable. As for magenta ink pigments of the organic pigments, the pigment may be C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48(Ca), 48(Mn), 48:2, 48:3, 48:4, 49, 49:1, 50, 51, 52, 52:2, 53:1, 53, 55, 57(Ca), 57:1, 60, 60:1, 63:1, 63:2, 64, 64:1, 81, 83, 87, 88, 89, 90, 101 (bengala), 104, 105, 106, 108(cadmium red), 112, 114, 122(quinacridone magenta), 123, 146, 149, 163, 166, 168, 170, 172, 177, 178, 179, 184, 185, 190, 193, 202, 209, 219, 269, C.I. Pigment Violet 19 or the like. Among them, C.I. Pigment Red 122 is particularly preferable. As for cyan ink pigments of the organic pigments, the pigment may be C.I. Pigment Blue 1, 2, 3, 15, 15:1, 15:2, 15:3, 15:34, 16, 17:1, 22, 25, 56, 60, C.I. Pigment Vat Blue 4, 60, 63, or the like. Among them, C.I. Pigment Blue 15:3 is particularly preferable.

As for an inorganic pigment used as the colorant, examples thereof include titanium oxide, iron oxide, calcium carbonate, barium sulfate, aluminum hydroxide, barium yellow, cadmium red, chrome yellow, carbon black and the like. Among these, carbon black is particularly preferred. Further, as for the carbon black, examples thereof include those produced by a publicly known method such as a contact method, a furnace method, and a thermal method.

As for black ink pigments used as the colorant, examples of the carbon black may include Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080, Raven 1060, Raven 700 (all manufactured by Columbia Carbon CO., LTD.), Regal 400R, Regal 330R, Regal 660R, Mogul L, Black Pearls L, Monarch 700, Monarch 800, Monarch 880, Monarch 900, Monarch 1000, Monarch 1100, Monarch 1300, Monarch 1400 (all manufactured by Cabot Corporation), Color Black FW1, Color Black FW2, Color Black FW2V, Color Black 18, Color Black FW200, Color Black S150, Color Black S160. Color Black 5170, Printex 35, Printex U, Printex V, Printex 140U, Printex 140V, Special Black 6, Special Black 5, Special Black 4A, Special Black 4 (all manufactured by Degussa AG.), No. 25, No. 33, No. 40, No. 45, No. 47, No. 52, No. 900, No. 2200B, No. 2300, MCF-88, MA600, MA7, MA8, MA100 (all manufactured by Mitsubishi Chemical CO., LTD.). However, the carbon black is not limited to those above in the invention.

The colorant can be used alone (i.e., only a single type) or in a combination of plural types that are selected from the same group or different groups described in the above. The colorant may be a solid solution pigment consisting of two or more pigments.

The content of the colorant in the nonaqueous ink according to the present invention is not particularly limited, but preferably 2 mass % or more, more preferably 2 to 8 mass %, and still more preferably 3 to 6 mass %. It is possible, when the content is in the range above, to obtain an ink further improved both in printing property and storage stability and further to improve the hardening efficiency by the activating energy ray.

The colorant particle according to the present invention is not particularly limited, but preferably, colorant particles precipitated by preparing a solution in which the colorant is dissolved and an aqueous medium, and bringing the solution and the aqueous medium into contact with each other (hereinafter, referred to as build-up fine particles) are used. The colorant fine particles thus obtained have very small primary particle diameter and are readily dispersed.

Preferably in production of the build-up fine particles in the present invention, at least one of the solution in which the colorant is dissolved and the aqueous medium contains a dispersant (first dispersant). A more preferable embodiment will be described below.

The colorant particles can be produced by a method having: (1) a step of dissolving a water-insoluble colorant (organic pigment) together with the first dispersant (dispersing agent) in an aprotic water-insoluble organic solvent in the presence of alkali, to prepare a solution thereof; (2) a step of preparing a dispersion by mixing the resultant solution with an aqueous medium, in which particles of the water-insoluble colorant and the first dispersing agent are dispersed in a medium containing water. Further the method may employ: (3) a step of aggregating the particles of the water-insoluble colorant into redispersible agglomerates (flocks), separating the agglomerates from the dispersion, and (4) a step of redispersing the agglomerates to form fine particles redispersed in a redispersion medium. For improvement in crystallinity of the water-insoluble colorant, (5) a step of bringing the agglomerates into contact with an ester-based solvent, a ketone-based solvent or an alcoholic solvent and (6) a step of heat-treating the dispersion or agglomerates may be adopted. A second dispersant different from or identical with the first dispersant is preferably added in the steps (3) to (6). If the dispersion is switched to a nonaqueous dispersion, a dispersant having dispersibility in the medium thereof is preferably used. Considering these points, the first dispersant may be referred to as "aqueous dispersant" and the second dispersant as "nonaqueous dispersant". In the step (1), a pigment derivative may be dissolved in the colorant solution or the aqueous medium. The amount of the pigment derivative added is preferably 50% or less by mass, more preferably 5% or more and 30% or less, and particularly preferably 7% or more and 15% or less, with respect to the colorant from the viewpoint of stability of the pigment particles. "Nonaqueous dispersion" or "nonaqueous ink" in the present invention means a dispersion or an ink not containing water as a main medium. The water content is preferably reduced to less than 10 mass %, from the viewpoint of preventing deterioration of long-term storage stability of ink and troubles such as blurring and color bleeding, and the water content is more preferably reduced to less than 5 mass % from the viewpoint of preventing deterioration in photohardening velocity of an ink and mechanical strength of a hardened film.

As the aprotic organic solvent, aprotic organic solvents having 5% by mass or more of solubility to water are preferably used. Furthermore, aprotic organic solvents that can be freely mixed with water are preferable. Specifically, examples of preferable solvents include dimethylsulfoxide, dimethylimidazolidinone, sulfolane, N-methyl pyrrolidone, dimethylformamide, acetonitrile, acetone, dioxane, tetramethylurea, hexamethylphosphoramide, hexamethylphosphoro triamide, pyridine, propionitrile, butanone, cyclohexanone, tetrahydrofuran, tetrahydro pyran, ethyleneglycol diacetate, and γ-butyrolactone. Of these solvents, dimethylsulfoxide, N-methylpyrrolidone, dimethylformamide, dimethylimidazolidinone, sulfolane, acetone, acetonitrile, and tetrahydrofuran are preferable. Further, these solvents may be used singly or in a combination thereof.

The proportion of the aprotic solvent to be used is not particularly limited. However, it is preferred to use the solvent in the proportion of 2 parts by mass to 500 parts by mass, more preferably from 5 parts by mass to 100 parts by mass with respect to 1 part by mass of the colorant respectively, in order to improve a dissolution state of the colorant, to form easily fine particles having a desired particle size, and to improve a color density of aqueous dispersion.

As an alkali to be incorporated in the aprotic solvent, examples thereof include an inorganic base such as sodium hydroxide, calcium hydroxide and barium hydroxide; and organic bases such as trialkylamine, diazabicycloundecene (DBU) and metal alkoxide. The alkali can be used appropriately in accordance with a purpose of dissolving a colorant or a dispersing agent. No particular limitation is imposed on the amount of the alkali to be incorporated. In the case of the inorganic base, it is preferably 1.0 to 30 molar equivalents relative to the colorant, more preferably 2.0 to 25 molar equivalents, particularly preferably 3 to 20 molar equivalents. In the case of organic bases, it is preferably 1.0 to 100 molar equivalents relative to the colorant, more preferably 5.0 to 100 molar equivalents, particularly preferably 20 to 100 molar equivalents.

In the present invention, the "aqueous medium" refers to water alone, or a mixed solvent of water and an organic solvent soluble in water. The addition of the organic solvent is preferably used, for example, (i) in the case where only water is not sufficient for uniformly dissolving a colorant and a dispersing agent, (ii) in the case where only water is not sufficient for obtaining viscosity required for flowing through a flow path, and the like. In the case of alkaline, for example, the organic solvent is preferably an amide series solvent or a sulfur-containing compound solvent, more preferably a sulfur-containing-compound solvent, and particularly preferably dimethylsulfoxide (DMSO). In the case of acidic, the organic solvent is preferably a carboxylic acid series solvent, a sulfur-containing compound solvent or a sulfonic acid series solvent, more preferably a sulfonic acid series solvent, and particularly preferably methanesulfonic acid. Additionally, an inorganic compound salt, a dispersing agent as described below or the like may be dissolved into the aqueous medium in accordance with necessary.

The embodiment wherein a solution of a colorant homogeneously dissolved therein (water-insoluble solution) and an aqueous medium are mixed is not particularly limited. Examples of the embodiment include an embodiment in which the water-insoluble colorant solution is added to the aqueous medium with being stirred, and an embodiment in which the water-insoluble colorant solution and the aqueous medium are each delivered to a certain length of flow path in the same longitudinal direction, and both the solution and the medium contact with each other in the course of getting through the flow path, thereby to deposit fine particles of the colorant. With respect to the former (the embodiment of stirring and mixing), it is especially preferred to use an embodiment in which a feed pipe or the like is introduced in an aqueous medium so that the water-insoluble colorant solution is fed from the pipe for addition in liquid. More specifically, the addition in liquid can be performed by using an apparatus described in International Publication WO 2006/121018 pamphlet, paragraph Nos. 0036 to 0047. With respect to the latter (the embodiment of mixing both the solution and the medium by using the flow path), there can be used micro reactors described in JP-A-2005-307154, paragraph Nos. 0049 to 0052 and FIGS. 1 to 4, and JP-A-2006-78637, paragraph Nos. 0044 to 0050.

A condition for precipitation and formation of the colorant particles is not particularly limited, and can be selected from a range from a normal pressure condition to a subcritical or supercritical condition. The temperature at which the particles are prepared under normal pressure is preferably −30 to 100° C., more preferably −10 to 60° C., and particularly preferably 0 to 30° C. A mixing ratio of the colorant solution to the aqueous medium is preferably 1/50 to 2/3, more preferably 1/40 to 1/2, and particularly preferably 1/20 to 3/8 in volume ratio. The concentration of the particles in the mixed liquid at the time of precipitation of the particles is not particularly limited, but the amount of the particles of the colorant is preferably 10 to 40,000 mg, more preferably 20 to 30,000 mg, and particularly preferably 50 to 25,000 mg, to 1,000 ml of the medium.

It is also preferable to heat the mixed liquid. As a result, crystallization of the colorant such as pigment (formation of strong crystal) is improved, and the ink prepared by using such a dispersion liquid is improved in stability and distinctively in weather resistance of the recorded image. The temperature of the heat treatment is preferably 50 to 120° C., and more preferably 80 to 100° C. The heating time of period is preferably 10 minutes to 3 days, more preferably 1 hour to 1 day, and still more preferably 1 to 6 hours. Excessively high heating temperature and elongation of the heating time of period may lead to excessive growth of the particles and are thus unfavorable. The liquid may be left still or stirred during the heating.

In preparation of the build-up fine particles, the first dispersant for use may be favorably a dispersant soluble in an aprotic organic solvent in the presence of alkali that obtains a dispersion effect by forming colorant-containing particles in the aqueous medium when a solution prepared by dissolving the water-insoluble colorant and the dispersant, and the aqueous medium are mixed. It is preferable to use a surfactant or polymer compound, having a hydrophilic component containing at least one selected from the group consisting of a carboxylic acid group, a sulfonic acid group, a phosphoric acid group, a hydroxyl group, and an alkyleneoxide group. More preferable dispersing agent is a compound that can dissolve stably together with organic pigments in an aprotic organic solvent in the presence of alkali. When a hydrophilic component of the dispersing agent is composed of only other group(s) than the above groups, such as a primary, secondary, or tertiary amino group and a quaternary ammonium group, a dispersion property is sufficient in an alkali-containing aqueous dispersion of an organic pigment. However, a degree of dispersion stability is sometimes relatively small.

Specific examples of the preferable polymer dispersing agent as the first dispersing agent include polyvinyl pyrrolidone, polyvinyl alcohol, polyvinyl methyl ether, polyethylene oxide, polyethyleneglycol, polypropyleneglycol, and polyacrylamide.

Specific examples of the polymer compound used for the other dispersing agents include block-copolymers, random copolymers, or graft copolymers, or modified materials of these copolymers and salts thereof, each of which is composed of at least two monomer components selected from styrene, styrene derivative, vinylnaphthalene, vinylnaphthalene derivative, aliphatic alcohol esters of α,β-ethylenycally unsaturated carboxylic acid, acrylic acid, acrylic acid derivative, methacrylic acid, methacrylic acid derivative, maleic acid, maleic acid derivative, alkenyl sulfonic acids, vinyl amines, allyl amines, itaconic acid, itaconic acid derivative, fumaric acid, fumaric acid derivative, vinyl acetate, vinyl phosphoric acid, vinyl pyrrolidone, acrylamide, N-vinyl acetoamide, N-vinylformamide, and derivative compounds thereof, with the proviso that at least one of those is a monomer having a functional group becoming carboxylic acid group, sulfonic acid group, phosphoric acid group, hydroxy group, or alkyleneoxide group.

As the polymer compound that are used as a dispersing agent, there can be preferably used natural polymer compounds such as albumin, gelatin, rosin, shellac, starch, gum Arabic, and sodium alginate; and their modified compounds. Further, these dispersing agents may be used singly, or in a combination thereof.

The content of the first dispersing agent is not particularly limited, and is preferably 0.05 part or more by mass and 5 parts or less by mass per part by mass of the colorant. The content is more preferably 0.2 part or more by mass and 4 parts or less by mass from a viewpoint that the dispersing agent easily disperses the colorant in the medium which forms the nonaqueous ink, and further the content is in particular preferably 0.5 part or more by mass and 2 parts or less by mass in order to restrain the primary particle diameter of the colorant particles from becoming large. When the use amount of the first dispersing agent is in the range above, aggregates wherein primary particles of the colorant aggregate strongly with each other are not easily produced. Thus, even when aggregates of the colorant which will be described later are formed, the aggregates easily disperse in the nonaqueous ink medium. The content of the first dispersant is preferably 50 parts by mass or less with respect to 100 parts by mass of the aprotic organic solvent. If the content of the dispersant is equal to or less than the upper limit with respect to 100 parts by mass of the aprotic organic solvent, the solubility of the dispersant in the colorant solution or in the aqueous medium is improved and the dispersibility of the colorant particles when they precipitate is distinctively improved, and, if the content of the dispersant is not less than the lower limit, the stability effect of the dispersibility is improved distinctively.

The dispersant contained in the nonaqueous ink according to the present invention may be the first dispersant described above, the other second dispersant, or a combination of the first dispersant with the second dispersant. The first dispersant and second dispersant may be the same as or different from each other, but the second dispersant is preferable a nonaqueous dispersant, and examples thereof include the followings.

Examples of the polymer dispersant include polymer dispersants such as DisperBYK-101, DisperBYK-102, DisperBYK-103, DisperBYK-106, DisperBYK-111, DisperBYK-161, DisperBYK-162, DisperBYK-163, DisperBYK-164, DisperBYK-166, DisperBYK-167, DisperBYK-168, DisperBYK-170, DisperBYK-171, DisperBYK-174, and DisperBYK-182 (all manufactured by BYK Chemie), EFKA4010, EFKA4046, EFKA4080, EFKA5010, EFKA5207, EFKA5244, EFKA6745, EFKA6750, EFKA7414, EFKA7462, EFKA7500, EFKA7570, EFKA7575, and EFKA7580 (all manufactured by EFKA Additives), Disperse Aid 6, Disperse Aid 8, Disperse Aid 15, and Disperse Aid 9100 (manufactured by San Nopco Limited); various types of Solsperse dispersants such as Solsperse 3000, 5000, 9000, 12000, 13240, 13940, 17000, 24000, 26000, 28000, 32000, 36000, 39000, 41000 and 71000 (manufactured by Avecia); Adeka Pluronic L31, F38, L42, L44, L61, L64, F68, L72, P95, F77, P84, F87, P94, L101, P103, F108, L121 and P-123 (manufactured by Adeka Corporation), Isonet S-20 (manufactured by Sanyo Chemical Industries, Ltd.), and Disparlon KS-860, 873SN, and 874 (polymer dispersant), #2150 (aliphatic poly carboxylic acid), and #7004 (polyether ester type) (manufactured by Kusumoto Chemicals, Ltd.). It is also possible to use in combination a pigment derivative such as a phthalocyanine derivative (trade name: EFKA-745 (manufactured by EFKA)), or Solsperse 5000, 12000 or 22000 (manufactured by Avecia).

Examples of the surfactant that can be used as the dispersant or together with the dispersant include those described in JP-A-62-173463 and JP-A-62-183457. Specific examples thereof include anionic surfactants, such as a dialkylsulfosuccinate salt compound, an alkylnaphthalenesulfonate salt compound, and a fatty acid salt compound; nonionic surfactants, such as a polyoxyethylene alkyl ether compound, a polyoxyethylene alkyl allyl ether compound, an acetylene glycol compound, and a polyoxyethylene/polyoxypropylene block copolymer compound; and cationic surfactants, such as an alkylamine salt compound and a quaternary ammonium salt compound. An organofluoro compound may be used in place of the above-described surfactant. The organofluoro compound is preferably hydrophobic. Examples of the organofluoro compound include a fluorine-containing surfactant, an oily fluorine-containing compound (e.g., fluorine oil), and a solid state fluorine-containing compound resin (e.g., tetrafluoroethylene resin). Examples of the organofluoro compound are described, for example, in JP-B-57-9053 ("JP-B" means examined Japanese patent publication) (columns from 8 to 17), and JP-A-62-135826.

Specifically, the surfactant that can be used in the present invention may be properly selected from previously known surfactants and derivatives thereof, including anionic surfactants such as alkylbenzene sulfonic acid salts, alkylnaphthalene sulfonic acid salts, higher fatty acid salts, sulfonic acid salts of higher fatty acid esters, sulfuric acid ester salts of higher alcohol ether, sulfonic acid salts of higher alcohol ether, alkylcarboxylic acid salts of higher alkylsulfonamide, and alkylphosphoric acid salts; nonionic surfactants such as polyoxyethylene alkyl ethers, polyoxyethylene alkylphenyl ethers, polyoxyethylene fatty acid esters, sorbitan fatty acid esters, ethyleneoxide adducts of acetylene glycol, ethyleneoxide adducts of glycerol, and polyoxyethylene sorbitan fatty acid esters; and in addition to the above, amphoteric surfactants such as alkyl betaines and amido betaines; and silicone-based surfactants and fluorine-based surfactants.

With respect to the surfactant, for example, a compound which has a structure comprising both a hydrophilic part and a hydrophobic part in the molecule can be effectively used. Further, any of an anionic surfactant, a cationic surfactant, an amphoteric surfactant, and a nonionic surfactant can be used.

Specific examples of the anionic surfactants include sodium dodecylbenzene sulfonate, sodium lauryl sulfate, disodium alkyldiphenyl ether disulfonate, sodium alkylnaphthalene sulfonate, dialkyl sulfosuccinate sodium, sodium stearate, potassium oleate, dioctyl sulfosuccinate sodium, sodium polyoxyethylene alkyl ether sulfate, sodium polyoxyethylene alkyl ether sulfate, sodium polyoxyethylene alkylphenyl ether sulfate, dialkyl sulfosuccinate sodium, sodium stearate, sodium oleate, sodium t-octylphenoxyethoxy polyethoxyethyl sulfate. These anionic surfactants may be used singly, or in a combination of two or more of them.

Specific examples of the nonionic surfactants include nonionic surfactants, such as polyoxyethylene lauryl ethers, polyoxyethylene octyl phenyl ethers, polyoxyethylene oleyl phenyl ethers, polyoxyethylene nonyl phenyl ethers, oxyethylene/oxypropylene block copolymers, t-octylphenoxyethyl polyethoxy ethanol, nonylphenoxyethyl polyethoxy ethanol. These, nonionic surfactants may be used singly or in a combination of two or more of them.

The cationic surfactants include surfactants such as tetraalkylammonium salts, alkylamine salts, benzalkonium salts, alkylpyridinium salts and imidazolium salts. Specific examples of the cationic surfactant include, for example, dihydroxyethyl stearyl amine, 2-heptadecenyl-hydroxyethyl imidazoline, lauryldimethylbenzylammonium chloride, cetylpyridinium chloride, stearylamidomethylpyridinium chloride.

When a polymer dispersant is used as a dispersant contained in an ink, the polymer dispersant having a mass-average molecular weight of 2,000 to 60,000 is preferable. It should be noted that when described simply as a molecular weight in the present invention, the molecular weight means weight average molecular weight, and the weight average molecular weight, unless indicated otherwise, means an average molecular mass calculated in terms of polystyrene that is measured by gel permeation chromatography (carrier: tetrahydrofuran).

The amount of the dispersant contained in the ink is preferably in the range of 10% or more and 100% or less, more preferably 20% or more and 70% or less, particularly preferably 40% or more and 50% or less by mass ratio with respect to the colorant. It is possible to keep well polymerization reaction of the copresent cationically-polymerizable compound, to exhibit dispersion stability of the colorant, and to bring out extremely well interactions between each components in the ink, by adjusting the dispersant content in the range above.

In the dispersion of the nonaqueous ink according to the present invention, it is preferable to treat the mixed liquid containing precipitated colorant particles with acid, to treat the mixed liquid preferably by adding an acid thereto when forming aggregates, thereby to form particle aggregates. The acid treatment preferably includes a step of aggregating particles with an acid, separating the aggregate from the solvent (dispersion medium), concentrating it, removing the solvent therefrom and demineralizing (deacidifying) the resulting aggregate. Acidification of the system leads to reduction of the electrostatic repulsive force in the acidic hydrophilic portion, which in turn leads to aggregation of the particles.

As the acid used for aggregation of the particles, any acid may be used so long as acids convert the fine particles resistant to precipitation into aggregate in a form such as slurry, paste, powder-like, granular, cake-like (bulk), sheet-like, short fiber-like, or flake-like form that can be separated from the solvent efficiently by a common separation method. Preferably, an acid forming a water-soluble salt with the used alkali is used, and the acid itself is also preferably highly soluble in water. In order to conduct desalting as efficiently as possible, it is preferable that the amount of acid used is as small as possible so long as the particles aggregate in the amount of the acid. Examples of the acid include hydrochloric acid, sulfuric acid, nitric acid, acetic acid, phosphoric acid, trifluoroacetic acid, dichloroacetic acid, and methane sulfonic acid. Of these acids, hydrochloric acid, acetic acid, and sulfuric acid are particularly preferable. An aqueous dispersion liquid of pigment particles that has been processed with the acid so as to be easily separable can be easily separated by using a centrifugal separator, an apparatus for filtration, a slurry liquid-solid separator or the like. At this time, a degree of desalting or solvent removal can be controlled by adding diluent water, or by increasing frequency of decantation and washing by water.

If necessary, it is possible to use the thus-obtained aggregate in a form of fine powder that is obtained by a drying method such as a spray-dry method, centrifugal separation drying method, a filter drying method, a freeze-drying method, or a heat drying method in order to remove unnecessary water or water-soluble organic solvent. A spray-dry method, a centrifugal separation drying method, a filter drying method or a freeze-drying method is preferred and a spray-drying method or a freeze-drying method is more preferred in order to restrain the formation of aggregates wherein primary particles of the colorant aggregate strongly with each other so that even at the time of the formation of the aggregates of the colorant, which will be described later, from the viewpoint of facilitating dispersion of the aggregates into the nonaqueous ink medium.

In the present specification, the above-described aggregation which possesses a re-dispersible property may be referred to as Agglomeration, distinguished from strong aggregation not having re-dispersible property. Particularly, these properties can be explained as follows:

<Aggregation (Hard Aggregation)>

For example a primary particles are adhered each other at their crystalline surfaces as the crystalline growth. The grown particle can not consequently be separated, unless otherwise the particle is broken.

<Agglomerate>

For example particles are adhered at the tip or edge and the grown particle can be separated without broken. Flocculate, such as a soft aggregation of pigment particles spontaneously aggregated in the dispersion liquid is involved in the meaning of the term "Agglomerate". Such agglomerates may be referred to as flock(s).

It is noted that the above described states, in overall, may be referred to as merely aggregation when it is not necessary to distinguish them.

In the dispersant of the ink of the present invention, a colorant particle preferably has a crystalline structure. It is preferable that an agglomerate of the particle is brought into contact with an organic solvent, in order to form the crystalline structure. As the organic solvent, ester series solvents, ketone series solvents, alcoholic solvents, aromatic solvents and aliphatic solvents are preferable; ester series solvents and ketone series solvents are more preferable; and ester series solvents are particularly preferable. Examples of the ester series solvents include ethyl acetate, ethyl lactate, and 2-(1-methoxy) propyl acetate. Examples of the ketone series solvents include acetone, methyl ethyl ketone, methyl isobutyl ketone, and cyclohexanone. Examples of the alcoholic solvents include methanol, ethanol, and n-butanol. Examples of the aromatic solvents include benzene, toluene, and xylene. Examples of the aliphatic solvents include n-hexane and cyclohexane. Among them, methanol, ethyl acetate, acetone and ethyl lactate are more preferable; and acetone and ethyl lactate are particularly preferable.

The amount of the organic solvent used is not particularly limited, but, for example, it is preferred to use the organic solvent in the proportion of 0.01 part by mass to 10,000 parts by mass with respect to 100 parts by mass of the colorant. The amount of the organic solvent that is contained in the dispersion of the ink of the present invention is not particularly limited, but it is practical that the proportion of the organic solvent is in the range of 0.0001% by mass to 1% by mass.

The method of bringing the obtained aggregates into contact with the organic solvent described above is not particularly limited, but a method allowing separation of the aggregates from the organic solvent after contact is preferable. A method allowing separation of the organic solvent in a state of a liquid, such as decantation or filter filtration, is more preferable.

Although the reason is not clear, it is possible to increase crystallite diameter without increasing the particle diameter of the colorant particles contained in the dispersion by the contact treatment with an organic solvent. It is thus possible to increase the crystallinity of the colorant particles, while the primary particle diameter during precipitation of the particles is preserved. In addition, in the redispersion treatment described below, it is possible to redisperse the aggregate into a medium while the primary particle diameter during precipitation of the particles is preserved and to also preserve a dispersion having high dispersion stability. Also by conducting the above-described treatment, viscosity of the aggregate redispersion remains low, even when the aggregate dispersion is highly concentrated. It further shows well ejecting efficiency, when used as an inkjet recording liquid. These actions are probably exhibited because the excessive dispersant contained in the dispersion is released and removed by bringing the dispersion into contact with the organic solvent and then separating the dispersion from the organic solvent.

Because the dispersant present close to the surface of the colorant particles in the dispersion is bound tightly to the colorant particles, the particles are kept at high dispersion stability even after redispersion treatment described below without increasing the particle diameter of the colorant particles, while the primary particle diameter during precipitation of the particles is preserved.

In addition, the agglomerate in the present invention can be dispersed easily without need for large energy at the time of dispersing it in a medium. Although the reason is not clear, it seems that aggregation of the colorant particles are less easily tightened, because the portion of the colorant itself exposed on the surface of the colorant particles according to the present invention is small.

In the present invention, the second dispersant described above is used favorably, when the aggregate particles are redispersed. As a mean for a dispersion treatment, known methods may be used. For example, it is possible to use a dispersing machine such as sand mill, bead mill, ball mill, and Dissolver, or an ultrasonic treatment, depending on the necessity.

At this time, a mixture in paste or slurry state, which is prepared by previously adding a compound constituting the dispersion medium, a dispersant and additionally a compound assisting the dispersion of the particles in the dispersion medium to the aggregated particles, may be used. Further, heating, cooling, distillation or the like may be conducted for the purpose of enhancing efficiency of re-dispersion and other purpose of removing water, water-soluble organic solvents, or the like.

The cationically-polymerizable compound that can be used in the present invention is not particularly limited as long as it is a compound for which a polymerization reaction is initiated by a cationic polymerization initiating species generated from a cationic polymerization initiator, which is described later, and that cures, and various types of cationically-polymerizable monomers known as cationically photo-polymerizable monomers may be used. Preferred examples of the cationically-polymerizable monomers include epoxy compounds, vinyl ether compounds, and oxetane compounds described in JP-A-6-9714, JP-A-2001-31892, JP-A-2001-40068, JP-A-2001-55507, JP-A-2001-310938, JP-A-2001-310937, and JP-A-2001-220526. Furthermore, as the cationically-polymerizable compound, for example, a cationic polymerization type photocuring resin is known, and in recent years, cationic photopolymerization type photocuring resins that have been sensitized in a visible light wavelength region of 400 nm or greater have also been disclosed in, for example, JP-A-6-43633 and JP-A-8-324137.

Examples of the epoxy compounds include aromatic epoxides, alicyclic epoxides, and aliphatic epoxides. Examples of the aromatic epoxides include di- or poly-glycidyl ethers prepared in reaction of a polyvalent phenol having at least one aromatic ring or the alkyleneoxide adduct thereof with epichlorohydrin, and example thereof include di- or poly-glycidyl ethers of bisphenol A or the alkyleneoxide adduct thereof, di- or poly-glycidyl ethers of a hydrogenated bisphenol A or the alkyleneoxide adduct thereof, novolak epoxy resins, and the like. Examples of the alkyleneoxide include ethyleneoxide and propyleneoxide.

Preferred examples of the alicyclic epoxide include a compound containing cylcohexeneoxide or cyclopenteneoxide obtained by epoxidizing a compound having at least one cycloalkane ring such as cyclohexene or cyclopentene with a suitable oxidizing agent such as hydrogen peroxide or a peracid.

Examples of the aliphatic epoxide include di- or polyglycidyl ethers of an aliphatic polyvalent alcohol or the alkyleneoxide adduct thereof, and typical examples thereof include alkylene glycol diglycidyl ethers such as ethylene glycol diglycidyl ether, propylene glycol diglycidyl ether and 1,6-hexanediol diglycidyl ether; polyvalent alcohol polyglycidyl ethers such as di- or tri-glycidyl ethers of glycerol or the alkyleneoxides adduct thereof, polyalkylene glycol diglycidyl ethers such as diglycidyl ether of polyethylene glycol or the alkyleneoxide adduct thereof and diglycidyl ether of a polypropylene glycol or the alkyleneoxide adducts thereof, and the like. Examples of the alkyleneoxide include ethyleneoxide and propyleneoxide.

The monofunctional and polyfunctional epoxy compounds that can be used in the present invention will be described below.

Examples of the monofunctional epoxy compounds include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monoxide, 1,2-epoxydodecane, epichlorohydrin, 1,2-epoxydecane, styrene oxide, cyclohexane oxide, 3-methacryloyloxymethyl cyclohexene oxide, 3-acryloyloxymethyl cyclohexene oxide, and 3-vinyl cyclohexene oxide.

Examples of the polyfunctional epoxy compounds include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolak resin, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexane carboxylate, bis(3,4-epoxycyclohexylmethyl)adipate, vinyl cyclohexane oxide, 4-vinyl epoxycyclohexane, bis(3,4-epoxy-6-methylcyclohexylmethyl)adipate, 3,4-epoxy-6-methylcyclohexyl-3',4'-epoxy-6'-methylcyclohexane carboxylate, methylenebis(3,4-epoxycyclohexane), dicyclopentadienediepoxide, di(3,4-epoxycyclohexylmethyl)ether of ethylene glycol, ethylenebis(3,4-epoxycyclohexyl carboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers, 1,13-tetradecadiene dioxide, limonene dioxide, 1,2,7,8-diepoxyoctane, and 1,2,5,6-diepoxycyclooctane.

Among these epoxy compounds, from the standpoint of curing rate, the aromatic epoxy compounds and alicyclic epoxy compounds are preferred, and the alicyclic epoxy compounds are especially preferred.

Examples of the vinyl ether compounds include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether; monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl vinyl ether, dodecyl vinyl ether, diethylene glycol monovinyl ether, and octadecyl vinyl ether.

The monofunctional and polyfunctional vinyl ethers will be described below.

Examples of the monofunctional vinyl ethers include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexyl methyl vinyl ether, 4-methylcyclohexylmethyl vinyl ether, benzyl vinyl ether, dicyclopentenyl vinyl ether, 2-dicyclopentenoxy ethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxy polyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethyl cyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxy polyethylene glycol vinyl ether.

Examples of the polyfunctional vinyl ether compounds include divinyl ethers such as ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ether, and bisphenol F alkylene oxide divinyl ether, and polyfunctional vinyl ethers such as trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, ethylene oxide adduct of trimethylolpropane trivinyl ether, propylene oxide adduct of trimethylolpropane trivinyl ether, ethylene oxide adduct of ditrimethylolpropane tetravinyl ether, propylene oxide adduct of ditrimethylolpropane tetravinyl ether, ethylene oxide adduct of pentaerythritol tetravinyl ether, propylene oxide adduct of pentaerythritol tetravinyl ether, ethylene oxide adduct of dipentaerythritol hexavinyl ether, and propylene oxide adduct of dipentaerythritol hexavinyl ether.

Among these vinyl ether compounds, from the standpoint of curability, adhesion to recording medium, and surface hardness of the formed image, di- or trivinyl ether compounds are preferred and divinyl ether compounds are especially preferred.

The oxetane compound that can be preferably used in the present invention means a compound having at least one oxetane ring and the preferred examples thereof are known oxetane compounds described in JP-A-2001-220526, JP-A-2001-310937, and JP-A-2003-341217.

As the compound having at least one oxetane ring that can be used in the present invention, compounds having 1 to 4 oxetane rings in the structure thereof are preferred. The advantage of using such compounds is in that the viscosity of the composition can be easily maintained with a range ensuring excellent handleability and a high adhesion of the cured ink to the recording medium can be obtained when the compound is used as an ink composition or a surface coating composition.

Examples of the compound having 1 or 2 oxetane rings in the molecule include the compounds represented by any one of the following formulas (1) to (3).

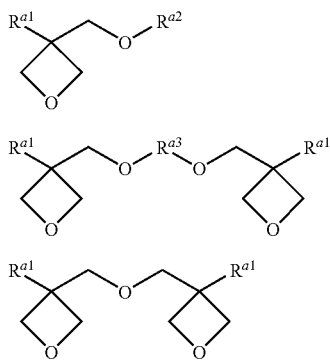

$R^{a1}$ represents a hydrogen atom, an alkyl group having 1 to 6 carbon atoms, a fluoroalkyl group having 1 to 6 carbon atoms, an allyl group, an aryl group, a furyl group or a thienyl group. When there are two $R^{a1}$s in a molecule, they may be the same as or different from each other. Examples of the alkyl groups include a methyl group, an ethyl group, a propyl group, and a butyl group; and preferable examples of the fluoroalkyl groups include the alkyl groups above of which any one or more of the hydrogen atoms are substituted with fluorine atoms.

$R^{a2}$ represents a hydrogen atom, an alkyl group having 1 to 6 carbon atoms, an alkenyl group having 2 to 6 carbon atoms, a group having an aromatic ring, an alkylcarbonyl group having 2 to 6 carbon atoms, an alkoxycarbonyl group having 2 to 6 carbon atoms, or an N-alkylcarbamoyl group having 2 to 6 carbon atoms. Examples of the alkyl group include a methyl group, an ethyl group, a propyl group, and a butyl group; and examples of the alkenyl groups include a 1-propenyl group, a 2-propenyl group, a 2-methyl-1-propenyl group, a 2-methyl-2-propenyl group, a 1-butenyl group, a 2-butenyl group, and a 3-butenyl group; and examples of the groups having an aromatic ring include a phenyl group, a benzyl group, a fluorobenzyl group, a methoxybenzyl group, and a phenoxyethyl group. Examples of the alkylcarbonyl groups include an ethylcarbonyl group, a propylcarbonyl group, and a butylcarbonyl group; examples of the alkoxycarbonyl groups include an ethoxycarbonyl group, a propoxycarbonyl group, and a butoxycarbonyl group; and examples of the N-alkylcarbamoyl groups include an ethylcarbamoyl group, a propylcarbamoyl group, a butylcarbamoyl group, and a pentylcarbamoyl group. In addition, $R^{a2}$ may have a substituent group; and examples of the substituent groups include alkyl groups having 1 to 6 carbon atoms and a fluorine atom.

$R^{a3}$ represents a linear or branched alkylene group, a linear or branched poly(alkyleneoxy) group, a linear or branched unsaturated hydrocarbon group, a carbonyl group or a carbonyl group-containing alkylene group, a carboxyl group-containing alkylene group, a carbamoyl group-containing alkylene group, or the groups shown below. Examples of the alkylene groups include an ethylene group, a propylene group, and a butylene group; and examples of the poly(alkyleneoxy) groups include a poly(ethyleneoxy) group and a poly(propyleneoxy) group. Examples of the unsaturated hydrocarbon groups include a propenylene group, a methylpropenylene group, and a butenylene group.

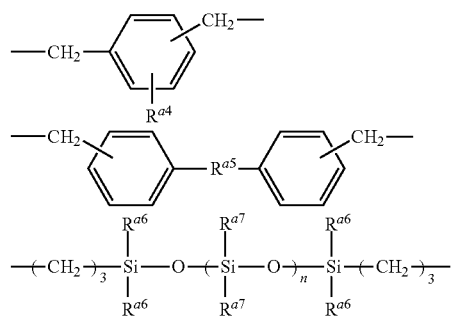

When $R^{a3}$ is one of the polyvalent group, $R^{a4}$ represents a hydrogen atom, an alkyl group having 1 to 4 carbon atoms, an alkoxy group having 1 to 4 carbon atoms, a halogen atom, a nitro group, a cyano group, a mercapto group, a lower alkylcarboxyl group, a carboxyl group, or a carbamoyl group.

$R^{a5}$ represents an oxygen, a sulfur atom, a methylene group, NH, SO, $SO_2$, $C(CF_3)_2$, or $C(CH_3)_2$.

$R^{a6}$ represents an alkyl group having 1 to 4 carbon atoms or an aryl group; and n represents an integer of 0 to 2,000. $R^{a7}$ represents an alkyl group having 1 to 4 carbon atoms, an aryl group, or a monovalent group having the following structure. In the formula below, $R^{a8}$ represents an alkyl group having 1 to 4 carbon atoms or an aryl group; and m is an integer of 0 to 100.

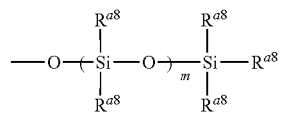

Examples of the compounds represented by formula (1) include 3-ethyl-3-hydroxymethyloxetane (OXT-101: manufactured by Toagosei Co., Ltd.), 3-ethyl-3-(2-ethylhexyloxymethyl)oxetane (OXT-212: manufactured by Toagosei Co., Ltd.), and 3-ethyl-3-phenoxymethyloxetane (OXT-211: manufactured by Toagosei Co., Ltd.). Examples of the compounds represented by formula (2) include 1,4-bis[(3-ethyl-3-oxetanylmethoxy)methyl)benzene (OXT-121: Toagosei Co., Ltd. In addition, examples of the compounds represented by formula (3) include bis(3-ethyl-3-oxetanylmethyl)ether (OXT-221: Toagosei Co., Ltd.).

Examples of the compounds having 3 or 4 oxetane rings include the compounds represented by the following formula (4).

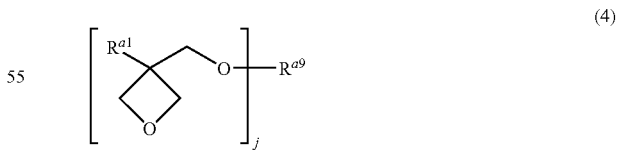

In formula (4), $R^{a1}$ is the same as that in formula (1) above. Examples of the polyvalent connecting group $R^{a9}$ include a branched alkylene group having 1 to 12 carbon atoms such as the groups represented by the following groups A to C, branched poly(alkyleneoxy) groups such as the groups represented by the following group D, and branched polysiloxy groups such as the group represented by the following group E, and the like. j is 3 or 4.

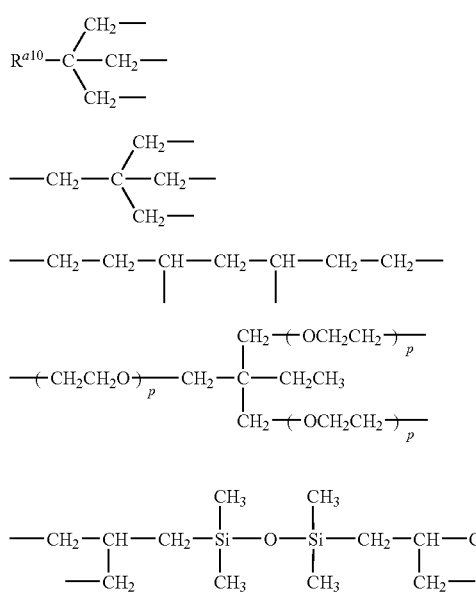

In the group A, $R^{a10}$ represents a methyl, ethyl or propyl group. In the group D, p is an integer of 1 to 10.

Other examples of the oxetane compounds that can be favorably used in the present invention include compounds represented by the following formula (5) having oxetane rings on its side chains.

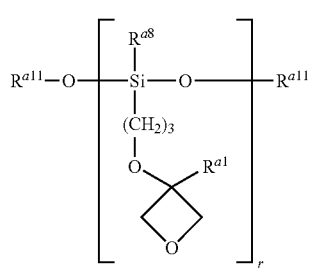

(5)

In formula (5), $R^{a1}$ and $R^{a8}$ are same as those in the above formula. $R^{a11}$ is an alkyl group having 1 to 4 carbon atoms such as a methyl group, an ethyl group, a propyl group and a butyl group, or a trialkylsilyl group. r is 1 to 4.

In addition to the above-described compounds having an oxetane ring(s), the compounds described in detail in the paragraph Nos. 0021 to 0084 of JP-A-2003-341217 can be also favorably used in the present invention. The oxetane compounds described in JP-A-2004-91556 may also be used in the present invention. The compounds are described in detail in the paragraph Nos. 0022 to 0058 of the same publication.

Among the oxetane compounds used in the present invention, from the standpoint of viscosity and adhesivity of the composition, the oxetane compound having 1 oxetane ring is preferably used.

The cationically-polymerizable compound that can be used in the present invention may be used singly or in a combination of two or more kinds thereof. From the standpoint of effectively suppressing the shrinkage during ink curing, it is preferred that at least one compound selected from oxetane compounds and epoxy compounds can be used together.

In the present invention, when a polyfunctional oxetane compound and/or a polyfunctional oxirane compound are used, the total amount of the polyfunctional oxetane compound and the polyfunctional oxirane compound is preferably less than 25 mass % of the entirety of the ink composition or the surface coating composition respectively. At a proportion of less than 25 mass %, an ink composition or a surface coating composition having excellent cured film stretchability can be provided.

In the present invention, when a cationically-polymerizable compound is used, it is preferable for it to comprise an oxetane compound and an oxirane compound, and it is more preferable for it to comprise a polyfunctional oxirane compound and a polyfunctional oxetane compound. Making an oxetane compound and an oxirane compound coexist in the composition enables the composition to be provided that has excellent curability and gives a cured film having high release properties from a mold during a molding process and high abrasion resistance such as scratch resistance. It is more preferable for a polyfunctional oxetane compound and a polyfunctional oxirane compound to coexist in the cationically-polymerizable compound.

Moreover, in the present invention, when a monofunctional cationically polymerizable compound is used, among the monofunctional monomers, it is preferable for it to comprise at least a monofunctional oxirane compound or a monofunctional oxetane compound, and it is particularly preferable for it to comprise a monofunctional oxetane compound.

Among the monofunctional monomers, it is preferable to use a monomer containing a cyclic group such as an aromatic group, an alicyclic cyclic group, or a heterocycle-containing group.

Preferred examples of the cationically-polymerizable compound that can be preferably used in the present invention include the cyclic structure-containing monomers (C-1) to (C-24) shown below.

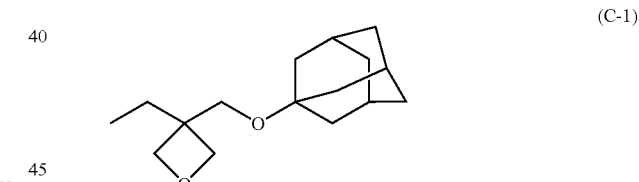

(C-1)

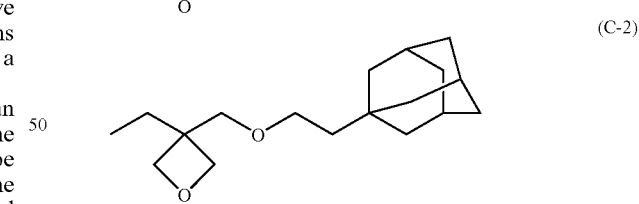

(C-2)

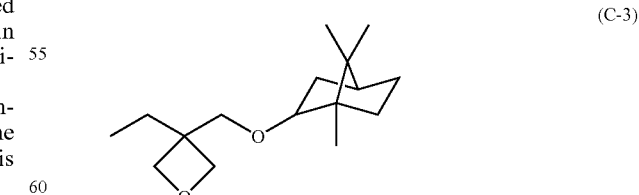

(C-3)

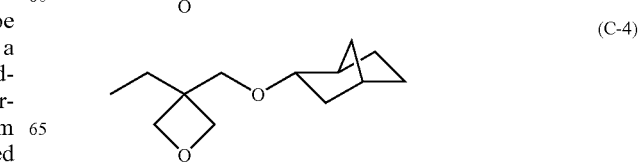

(C-4)

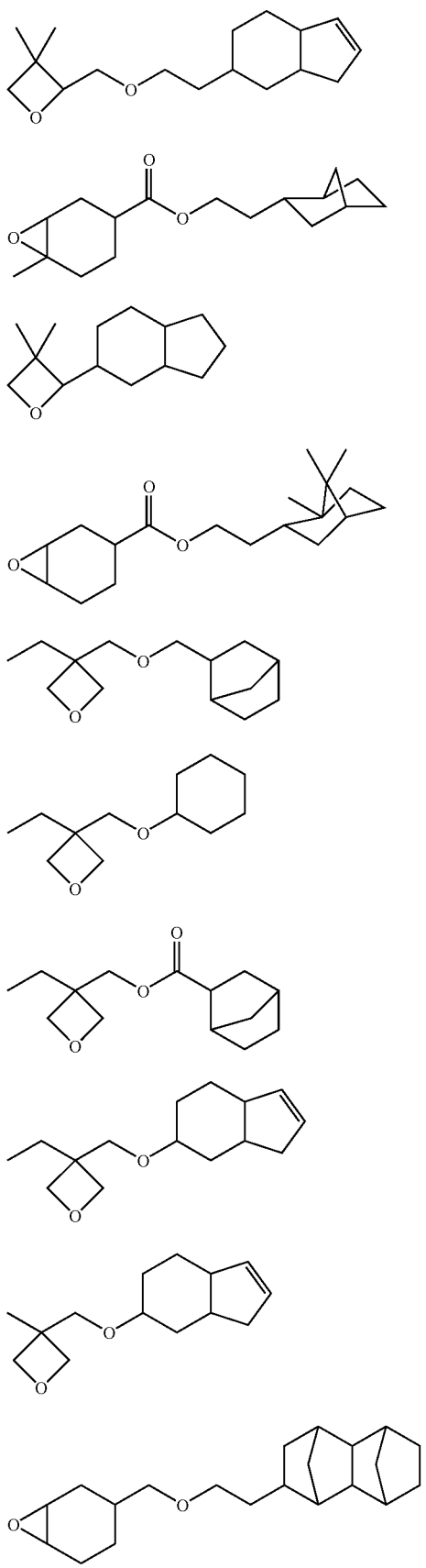

The content of the polymerizable monomer(s) in the non-aqueous ink of the present invention is preferably 60 to 95 mass %, more preferably 65 to 90 mass %, and still more preferably 70 to 90 mass %. When the polymerizable monomer content is in the range above, the excellent ink curability by activating energy ray irradiation and the excellent transparent color tone characteristic each specific to the present invention are more evident.

When a cationically-polymerizable compound is used in the present invention, it is preferable to use a cationic polymerization initiator. Examples of the cationic polymerization initiator (photo-acid generator) that can be used in the present invention include chemically amplified photoresists and compounds used in cationic photopolymerization ("Imejingu you Yukizairyou" (Organic Materials for Imaging), Ed., The Japanese Research Association for Organic Electronics Materials, Bunshin Publishing Co. (1993), pp. 187-192). Preferred examples of the cationic polymerization initiator in the present invention are listed below.

Firstly, $B(C_6F_5)_4^-$, $PF_6^-$, $AsF_6^-$, $SbF_6^-$, and $CF_3SO_3^-$ salts of aromatic onium compounds of diazonium, ammonium, iodonium, sulfonium, phosphonium, and the like can be cited. Secondly, sulfonated compounds that generate a sulfonic acid can be cited. Thirdly, halides that photogenerate a hydrogen halide can also be used. Fourthly, iron arene complexes can be cited.

Examples of the cationic polymerization initiator that can be preferably used in the present invention (exemplified compounds (b-1) to (b-96)) are described below. However, the present invention is not limited to these examples.

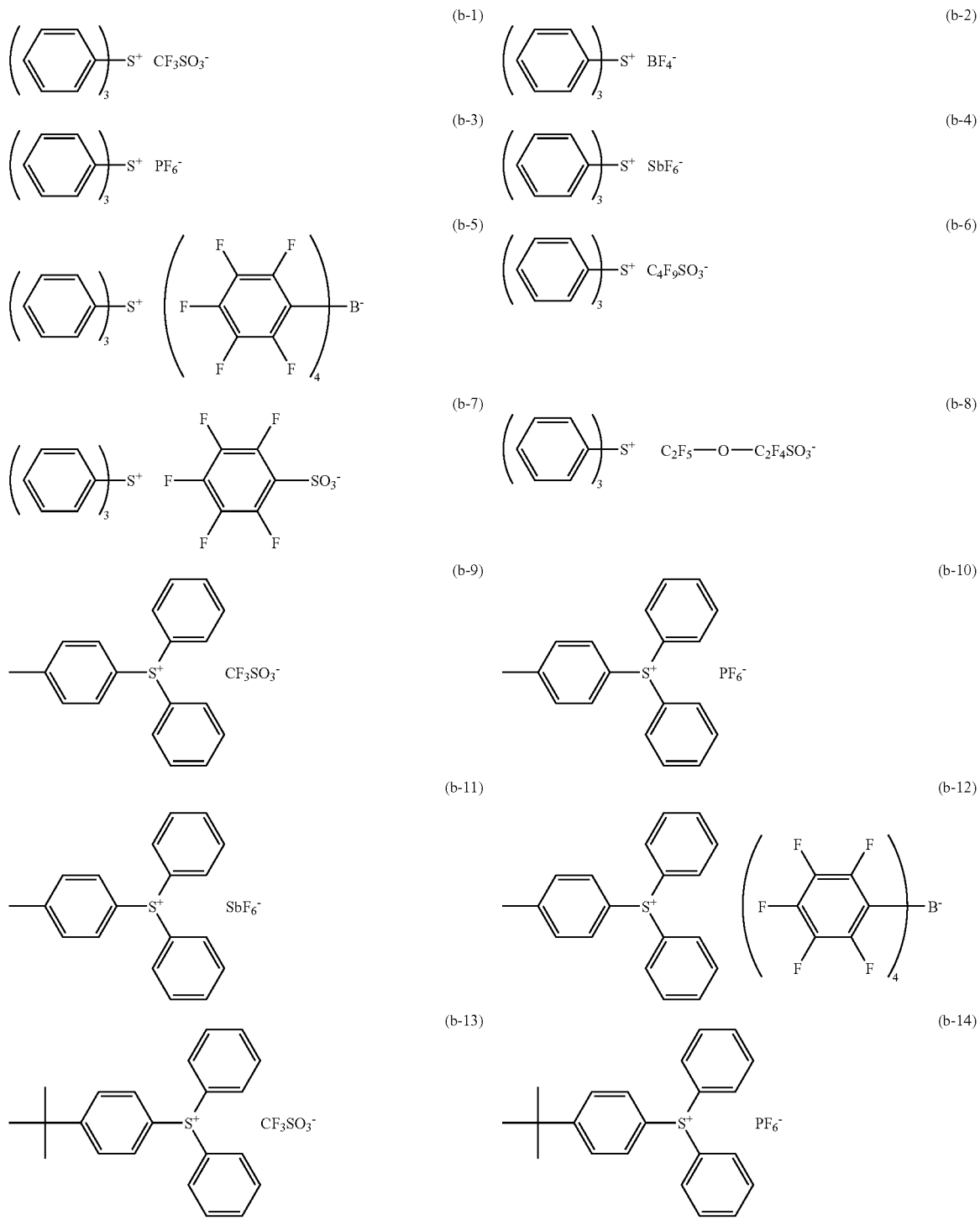

-continued
(b-15)
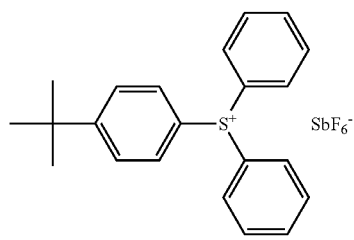
(b-16)
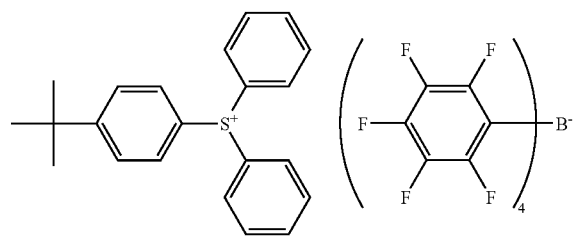
(b-17)
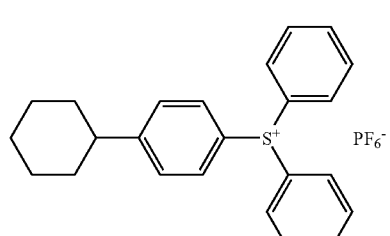
(b-18)
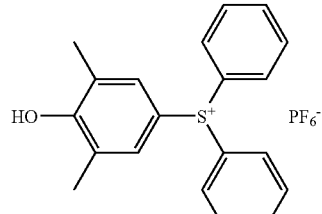
(b-19)
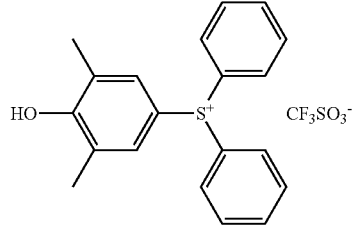
(b-20)
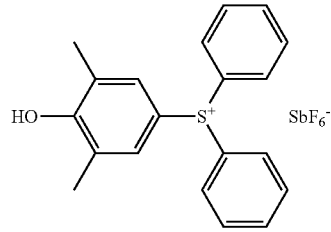
(b-21)
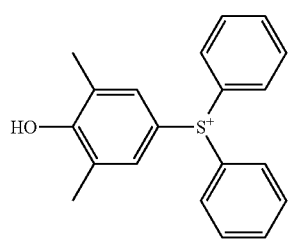
(b-22)
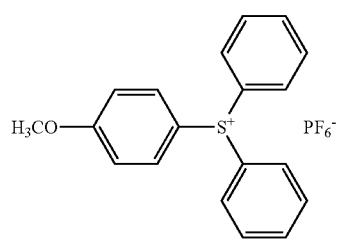
(b-23)
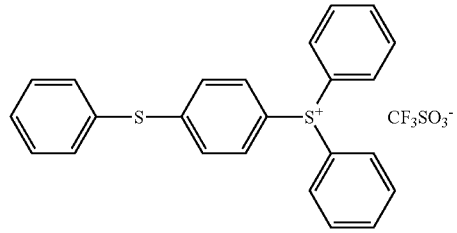
(b-24)
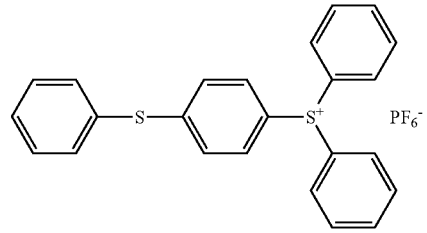
(b-25)
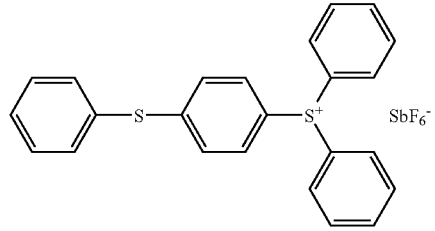
(b-26)
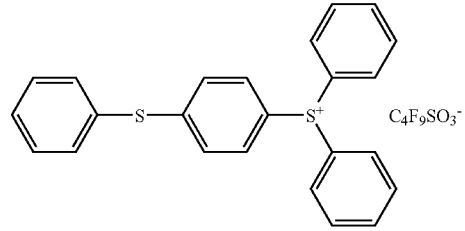

-continued
(b-27)
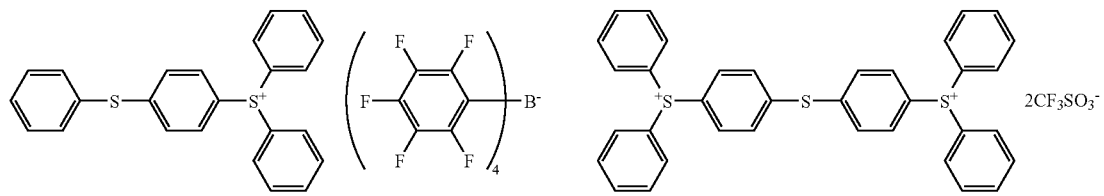
(b-28)
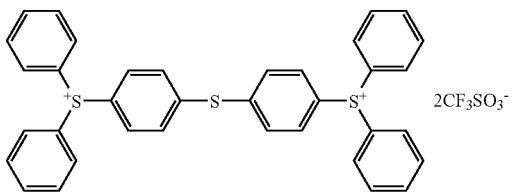
(b-29) (b-30)
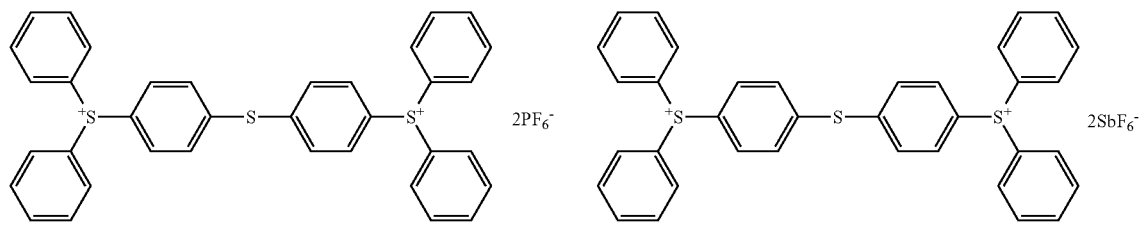
(b-31)
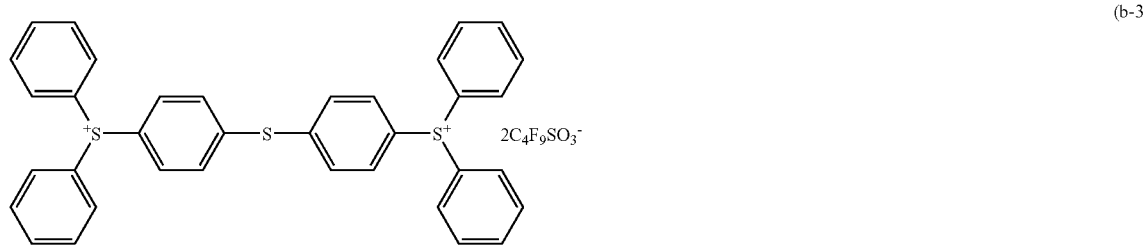
(b-32)
(b-33) (b-34)
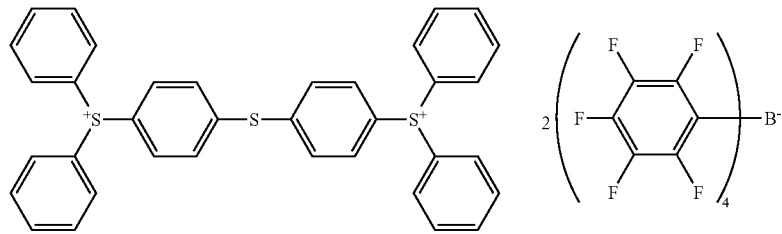
(b-35)
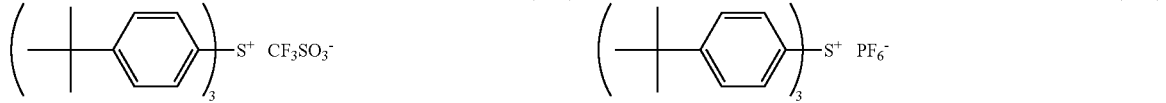
(b-36)
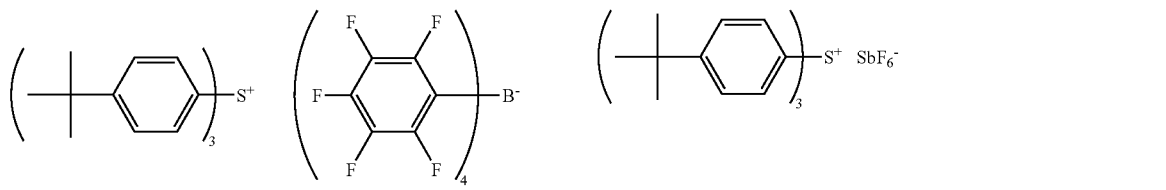
(b-37) (b-38)
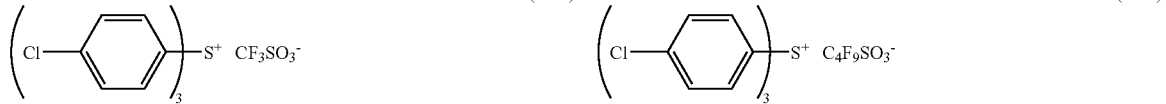
(b-39) (b-40)
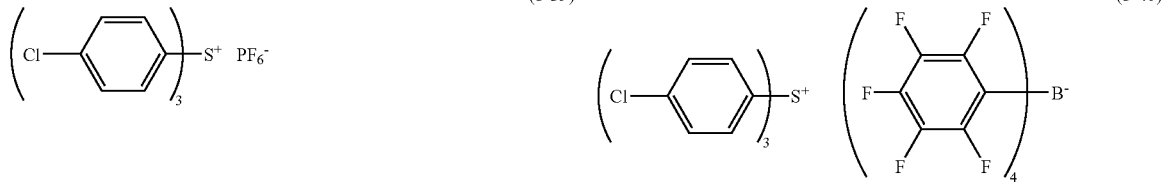

-continued
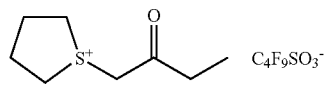 (b-41)
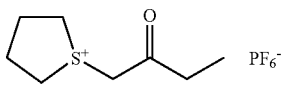 (b-42)
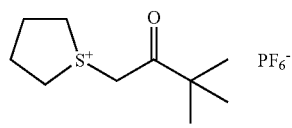 (b-43)
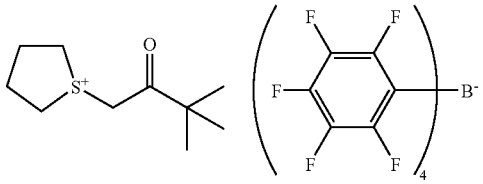 (b-44)
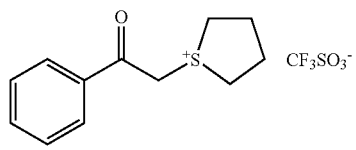 (b-45)
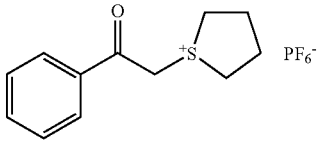 (b-46)
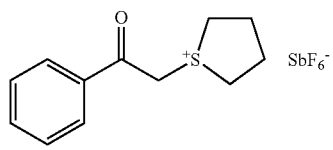 (b-47)
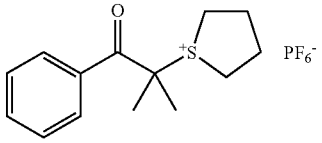 (b-48)
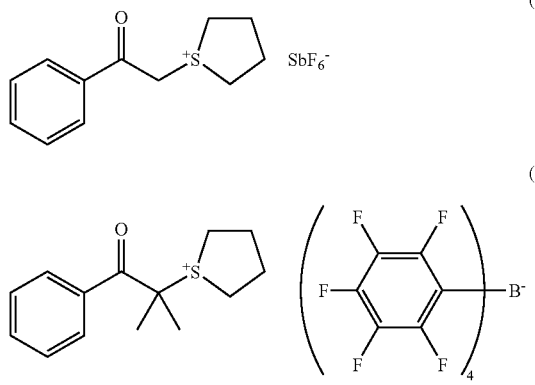 (b-49)
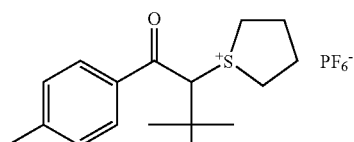 (b-50)
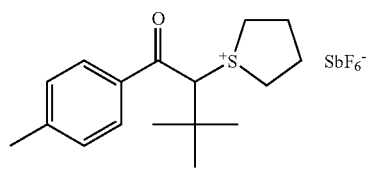 (b-51)
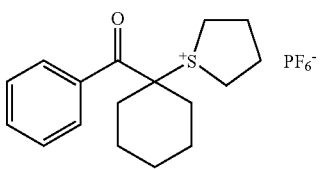 (b-52)
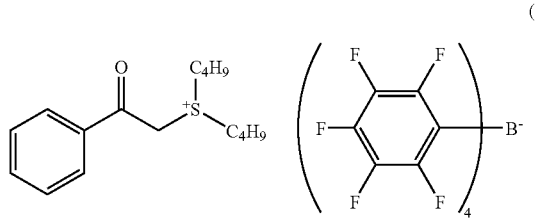 (b-53)
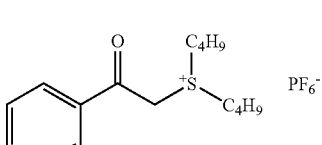 (b-54)
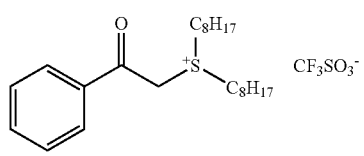 (b-55)
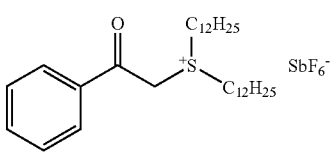 (b-56)
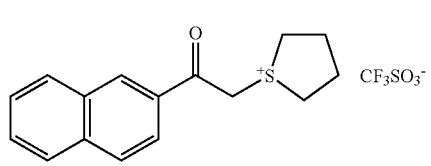 (b-57)
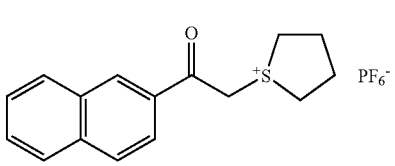 (b-58)

-continued
(b-59) 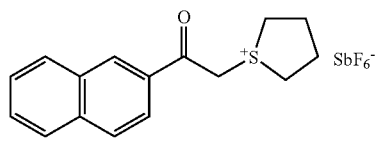 SbF$_6^-$
(b-60) 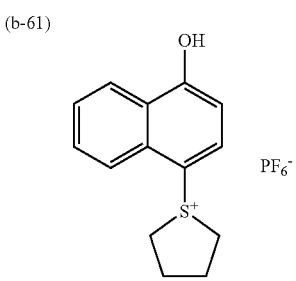
(b-61) 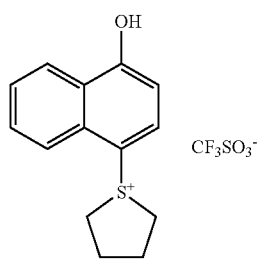 CF$_3$SO$_3^-$
(b-62) PF$_6^-$
(b-63) 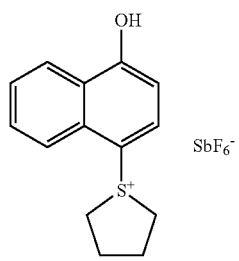 SbF$_6^-$
(b-64)
(b-65) 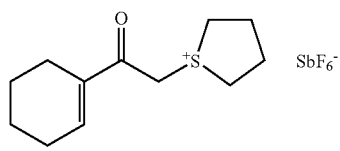 SbF$_6^-$
(b-66) PF$_6^-$
(b-67) 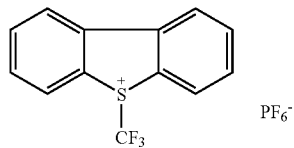 PF$_6^-$
(b-68) SbF$_6^-$
(b-69) 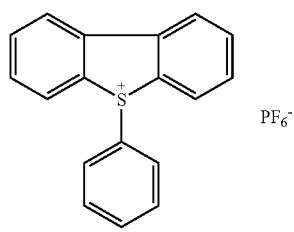 PF$_6^-$
(b-70) 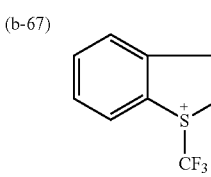 C$_4$F$_9$SO$_3^-$
(b-71) 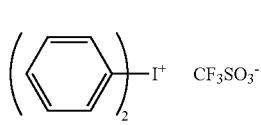 CF$_3$SO$_3^-$
(b-72) 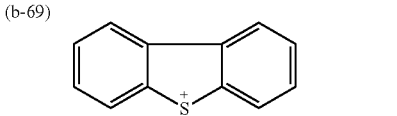 BF$_4^-$
(b-73) 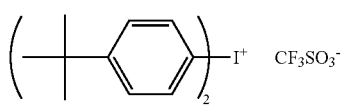 CF$_3$SO$_3^-$
(b-74) 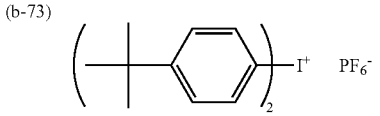 PF$_6^-$ -continued
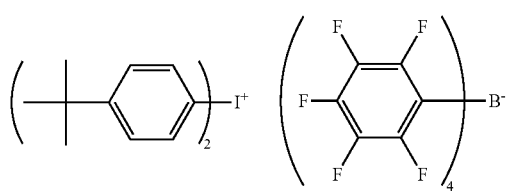 (b-75)
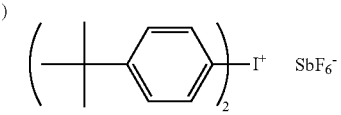 (b-76)
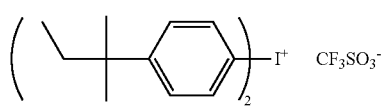 (b-77)
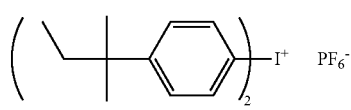 (b-78)
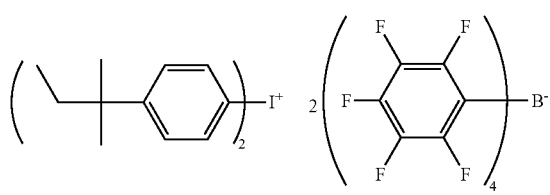 (b-79)
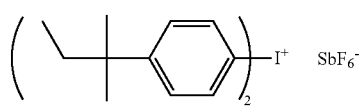 (b-80)
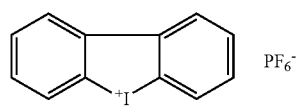 (b-81)
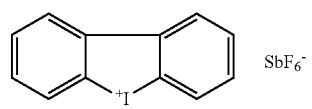 (b-82)
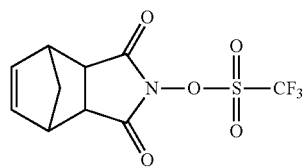 (b-83)
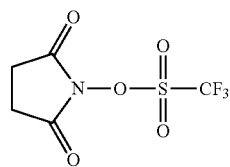 (b-84)
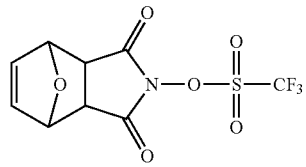 (b-85)
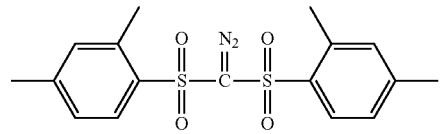 (b-86)
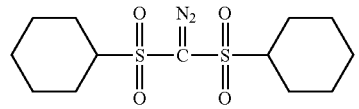 (b-87)
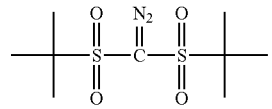 (b-88)
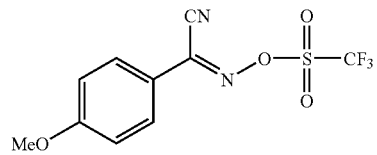 (b-89)
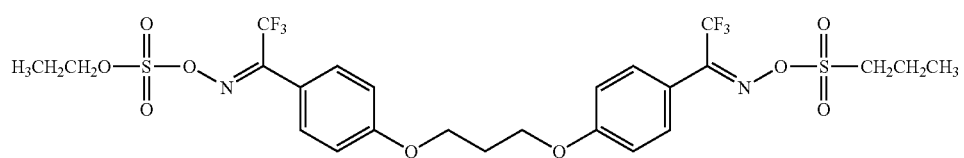 (b-90)
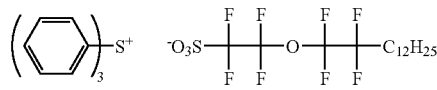 (b-91)
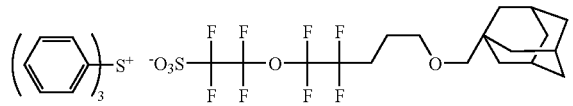 (b-92)

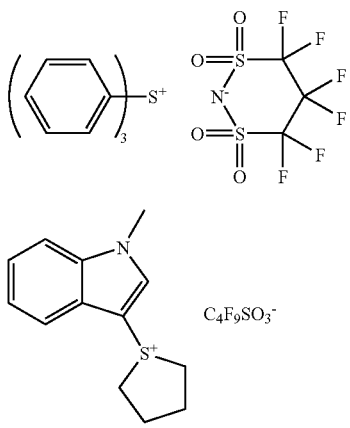 (b-93)

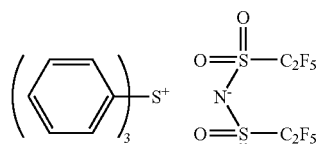 (b-94)

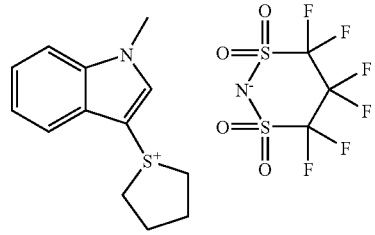 (b-96)

(b-95)

In the ink composition or surface coating composition that can be used in the present invention, the total amount of polymerization initiator used is preferably 0.01 to 35 mass % relative to the total amount of polymerizable monomer used, more preferably 0.5 to 20 mass %, and still more preferably 1.0 to 15 mass %. The ink composition or the surface coating composition can be cured sufficiently with 0.01 mass % or greater of the polymerization initiator, and a cured film having a uniform degree of curing can be obtained with 35 mass % or less. Furthermore, when a sensitizer, which will be described later, is used in the ink composition or surface coating composition that can be used in the present invention, the total amount of polymerization initiator used is preferably 200:1 to 1:200 relative to the sensitizer as a ratio by mass of (polymerization initiator):(sensitizer), more preferably 50:1 to 1:50, and still more preferably 20:1 to 1:5.

The nonaqueous ink of the present invention may contain other additives. Examples of the other additive include known additives such as fine resin particles, a latex polymer, a UV absorbing agent, a fade-preventing agent, a fungicide, a pH controlling agent, an anti-corrosive agent, an anti-oxidant, an emulsification stabilizer, an antiseptic, an anti-foaming agent, a viscosity controlling agent, a dispersion stabilizer, and a chelating agent.

As for the fine resin particle, for example, a fine particle comprising at least one of resin such as acrylic-based resin, vinyl acetate-based resin, styrene-butadiene-based resin, vinyl chloride-based resin, acrylic-styrene-based resin, butadiene-based resin, styrene-based resin, crosslinked acrylic resin, crosslinked styrene-based resin, benzoguanamine resin, phenol resin, silicone resin, epoxy resin, urethane-based resin, paraffin-based resin, or fluorocarbon resin; or a latex polymer including resin thereof may be used in the present invention.

Among them, preferable examples may include a fine particle comprising acrylic-based resin, acrylic-styrene-based resin, styrene-based resin, crosslinked acrylic resin, or crosslinked styrene-based resin; and the latex polymer including resin thereof.

In the case where fine resin particles or a latex polymer are added to prepare an ink for inkjet, they are added simultaneously with the pigment, etc. to prepare a pigment dispersion so as to achieve an improvement in fixing property.

A mass average molecular weight of the fine resin particles is preferably from 10,000 to 200,000. More preferably, it is from 100,000 to 200,000. An average particle diameter of the fine resin particles is preferably in the range of from 10 nm to 1 μm; more preferably from 10 nm to 200 nm; still more preferably from 20 nm to 100 nm; and particularly more preferably from 20 nm to 50 nm. The addition amount of the fine resin particles is preferably in the range of from 0.5% by mass to 20% by mass; more preferably from 3% by mass to 20% by mass, and still more preferably from 5% by mass to 15% by mass relative to the ink for inkjet. A glass transition temperature (Tg) of the fine resin particles is preferably 30° C. or higher; more preferably 40° C. or higher; and still more preferably 50° C. or higher.

The particle diameter distribution of polymer particles of latex polymer is not specifically limited, and any one having broad particle diameter distribution or monodispersed particle diameter distribution can be used. Further, two or more kinds of polymer fine particles having monodispersed particle diameter distribution can be used as a mixture.

Examples of the UV absorbing agent include benzophenone-based UV absorbing agent, benzotriazole-based UV absorbing agent, salicylate-based UV absorbing agent, cyanoacrylate-based UV absorbing agent, nickel complex salt-based UV absorbing agent, and the like.

As for the fade preventing agent, various types of organic or metal complex fade preventing agent can be used. Examples of the organic fade preventing agent include hydroquinones, alkoxyphenols, dialkoxyphenols, phenols, anilines, amines, indanes, chromanes, alkoxyanilines, heterocycles and the like. Examples of the metal complex include a nickel complex, a zinc complex and the like.

As for the fungicide, sodium dehydroacetic acid, sodium benzoic acid, sodium pyridinethion-1-oxide, p-hydroxybenzoic acid ethyl ester, 1,2-benzisothiazolin-3-one, sodium sorbate, sodium pentachlorophenol and the like can be included. The fungicide is preferably used in an amount of from 0.02% by mass to 1.00% by mass in the ink.

The above described pH controlling agent is not specifically limited as long as it does not have an adverse effect on an inkjet recording liquid to be produced and can adjust the pH to a desired value. It can be appropriately selected according to the purpose of use. Examples of the pH controlling agent include alcohol amines (for example, diethanolamine, triethanolamine, 2-amino-2-ethyl-1,3-propanediol and the like), hydroxides of an alkali metal (for example, lithium hydroxide, sodium hydroxide, potassium hydroxide and the like), ammonium hydroxides (for example, ammonium hydroxide and quaternary ammonium hydroxide), phosphonium hydroxides, alkali metal carbonates and the like.

Examples of the anti-corrosive agent include acidic sulfite, sodium thiosulfate, ammonium thiodiglycolate, diisopropyl ammonium nitrite, pentaerythritol tetranitric acid, dicyclohexyl ammonium nitrite and the like.

Examples of the anti-oxidant include phenol-based anti-oxidant (including a hindered phenol-based anti-oxidant), amine-based anti-oxidant, sulfur-based anti-oxidant, phosphorous-based anti-oxidant and the like.

Examples of the chelating agent include sodium ethylenediamine tetraacetic acid, sodium nitrilotriacetic acid, sodium hydroxyethyl ethylenediamine triacetic acid, sodium diethylene triamine pentaacetic acid, and sodium uramyldiacetic acid and the like.

The ink of the present invention may contain a sensitizer in order to promote decomposition of the above-mentioned polymerization initiator by absorbing specific activating energy ray. The sensitizer absorbs specific activating energy ray and attains an electronically excited state. The sensitizer in the electronically excited state causes actions such as electron transfer, energy transfer, or heat generation upon contact with the polymerization initiator. This causes the polymerization initiator to undergo a chemical change and decompose, thus forming a radical, an acid, or a base. As a sensitizer that can be used in the present invention, it is preferable to use a sensitizing dye. Preferred examples of the sensitizing dye include those that belong to compounds below and have an absorption wavelength in the region of 350 nm to 450 nm. Typical examples thereof include polynuclear aromatic compounds (e.g. pyrene, perylene, triphenylene), xanthenes (e.g. fluorescein, eosin, erythrosine, rhodamine B, rose bengal), cyanines (e.g. thiacarbocyanine, oxacarbocyanine), merocyanines (e.g. merocyanine, carbomerocyanine), thiazines (e.g. thionine, methylene blue, toluidine blue), acridines (e.g. acridine orange, chloroflavin, acriflavine), anthraquinones (e.g. anthraquinone), squaryliums (e.g. squarylium), and coumarins (e.g. 7-diethylamino-4-methylcoumarin).

More preferred examples of the sensitizing dye include compounds represented by any one of formulae (IX) to (XIII) below.

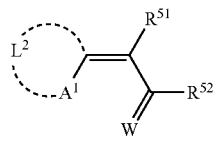

(IX)

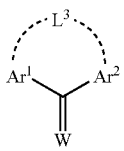

(X)

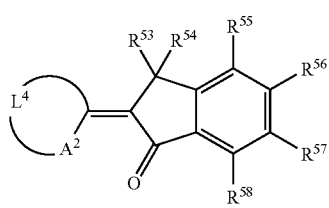

(XI)

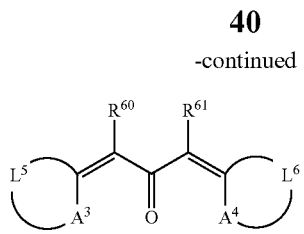

(XII)

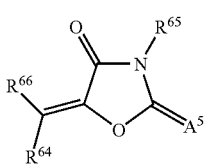

(XIII)

In formula (IX), $A^1$ represents a sulfur atom or $NR^{50}$; $R^{50}$ represents an alkyl group or an aryl group; $L^2$ represents a non-metal atom group to form a basic nucleus of the colorant in combination with the adjacent $A^1$ and the adjacent carbon atom; $R^{51}$ and $R^{52}$ each independently represent a hydrogen atom or a monovalent non-metal atom group; and $R^{51}$ and $R^{52}$ may bond to each other, forming an acid ring of the colorant. W represents an oxygen atom or a sulfur atom. In formula (X), $Ar^1$ and $Ar^2$ each independently represent an aryl group and are bound via a bond of -$L^3$-, wherein, $L^3$ represents —O— or —S—, and W is the same as that shown in formula (IX). In formula (XI), $A_2$ represents a sulfur atom or $NR^{59}$; $L^4$ represents a non-metal atom group to form the basic nucleus of the colorant with the adjacent $A_2$ and the adjacent carbon atom in combination. $R^{53}$, $R^{54}$, $R^{55}$, $R^{56}$, $R^{57}$ and $R^{58}$ each independently represent a monovalent non-metal atom group; and $R^{59}$ represents an alkyl group or an aryl group. In formula (XII); $A^3$ and $A^4$ each independently represent —S—, —$NR^{62}$— or —$NR^{63}$—; $R^{62}$ and $R^{63}$ each independently represent a substituted or unsubstituted alkyl group or a substituted or unsubstituted aryl group; $L^5$ and $L^6$ each independently represents, a non-metal atom group to form the basic nucleus of the colorant together with the adjacent $A^3$ and $A^4$ and the adjacent carbon atom; and $R^{60}$ and $R^{61}$ each independently represents a hydrogen atom or a monovalent non-metal atom group that can form an aliphatic or aromatic ring bonding to each other. In formula (XIII), $R^{66}$ represents a hetero-ring or an aromatic ring that may be further substituted, and $A^5$ represents an oxygen atom, a sulfur atom or =$NR^{67}$. $R^{64}$, $R^{65}$ and $R^{67}$ each independently represents a hydrogen atom or a monovalent non-metal atom group; and $R^{67}$ and $R^{64}$, and also $R^{65}$ and $R^{67}$ can bind to each other, forming an aliphatic or aromatic ring. Preferable typical examples of the compounds represented by formulae (IX) to (XIII) include the compounds (E-1) to (E-20) shown below.

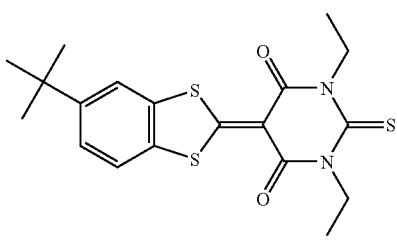

(E-1)

-continued
(E-2)
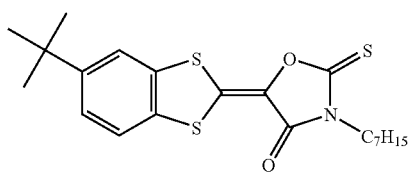
(E-3)
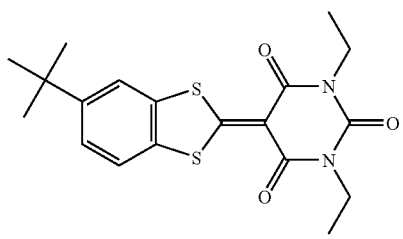
(E-4)
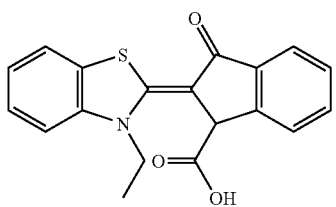
(E-5)
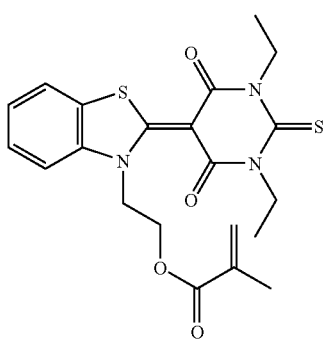
(E-6)
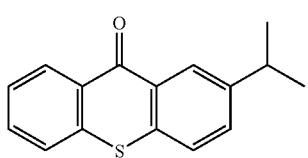
(E-7)
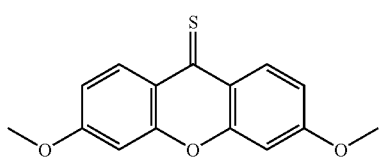
(E-8)
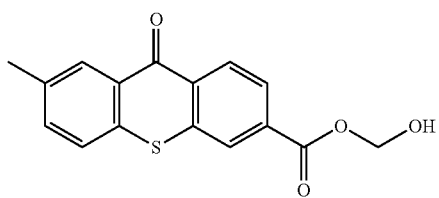
-continued
(E-9)
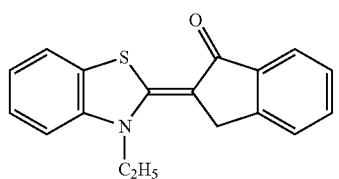
(E-10)
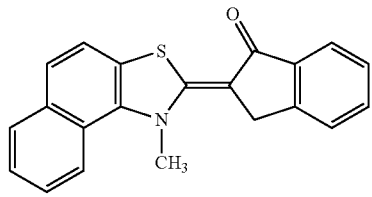
(E-11)
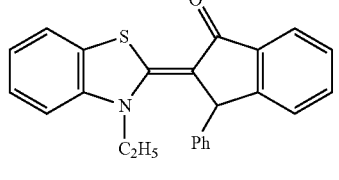
(E-12)
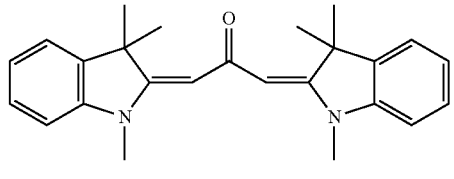
(E-13)
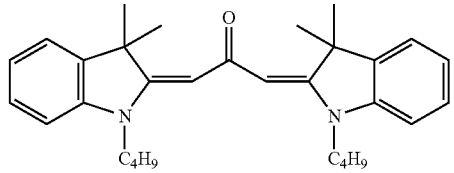
(E-14)
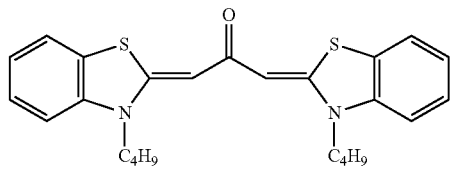
(E-15)
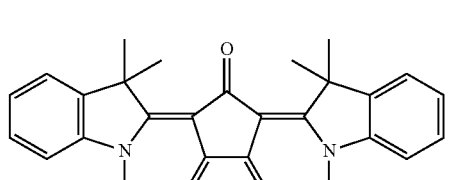
(E-16)
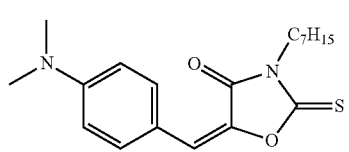

-continued

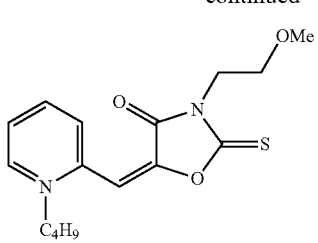
(E-17)

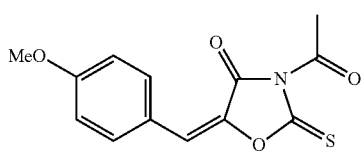
(E-18)

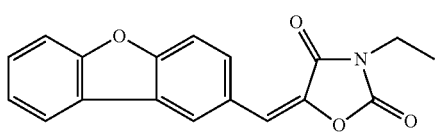
(E-19)

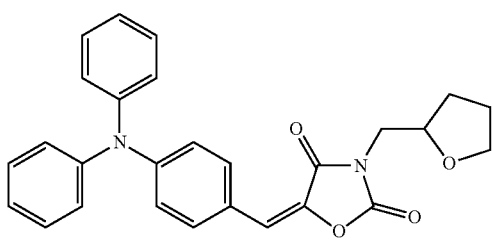
(E-20)

The content of the sensitizer sensitizing agent in the ink is appropriately selected according to the intended purpose, but it is preferably 0.05 to 4 mass % relative to the mass of the entire ink.

The ink composition that can be used in the present invention preferably contains a cosensitizing agent. In the present invention, the cosensitizing agent has the function of further improving the sensitivity of the sensitizing dye to activating energy ray or the function of suppressing inhibition by oxygen for polymerization of a polymerizable compound, etc. Examples of such the cosensitizing agent include amines such as compounds described in M. R. Sander et al., 'Journal of Polymer Society', Vol. 10, p. 3173 (1972), JP-B-44-20189, JP-A-51-82102, JP-A-52-134692, JP-A-59-138205, JP-A-60-84305, JP-A-62-18537, JP-A-64-33104, and Research Disclosure No. 33825, and specific examples thereof include triethanolamine, ethyl p-dimethylaminobenzoate, p-formyldimethylaniline, and p-methylthiodimethylaniline.

Other examples of the cosensitizing agent include thiols and sulfides such as thiol compounds described in JP-A-53-702, JP-B-55-500806, and JP-A-5-142772, and disulfide compounds of JP-A-56-75643, and specific examples thereof include 2-mercaptobenzothiazole, 2-mercaptobenzoxazole, 2-mercaptobenzimidazole, 2-mercapto-4(3H)-quinazoline, and .β-mercaptonaphthalene.

Still other examples of the cosensitizing agent include amino acid compounds (e.g. N-phenylglycine, etc.), organometallic compounds described in JP-B-48-42965 (e.g. tributyltin acetate, etc.), hydrogen-donating compounds described in JP-B-55-34414, sulfur compounds described in JP-A-6-308727 (e.g. trithiane, etc.), phosphorus compounds described in JP-A-6-250387 (diethylphosphite, etc.), Si—H compounds and Ge—H compounds described in JP-A-6-191605.

The content of the co-sensitizer in the ink composition is appropriately selected according to the intended purpose, but it is preferably 0.05 to 4 mass % relative to the mass of the entire ink composition or the surface coating composition.

The surface tension of the ink according to the present invention (at 20° C.) is preferably 20 mN/m or more and 60 mN/m or less. It is more preferably, 20 mN/m or more and 45 mN/m or less, still more preferably 25 mN/m or more and 40 mN/m or less. The surface tension is a value measured by using a surface tension balance (such as Surface Tension Balance CBVP-Z, manufactured by Kyowa Interface Science Co., Ltd.) according to the Wilhelmy method under the condition of a liquid temperature of 20° C. and 60% RH. The surface tension can be adjusted into a desired range, for example, by addition of a surfactant.

The viscosity of the inkjet recording liquid according to the present invention at 20° C. is preferably 5 mPa·s or more and 20 mPa·s or less, more preferably 5.5 mPa·s or more and less than 18 mPa·s, and still more preferably 6 mPa·s or more and less than 16 mPa·s from the viewpoint of ejecting efficiency. Alternatively, the viscosity of the inkjet recording liquid according to the present invention at 40° C. is preferably 3 mPa·s or more and 15 mPa·s or less, more preferably 3.5 mPa·s or more and less than 12 mPa·s and still more preferably 4 mPa·s or more and less than 10 mPa·s, and the viscosity can be adjusted into a desired range, for example, by modification of the molecular weight and the content of the water-soluble organic solvent. In the present invention, the viscosity can be adjusted into desired range more easily when the liquid contains the first water-soluble organic solvent described above. The viscosity is a value determined at 20° C. or 40° C. by using a TV-22 viscometer (manufactured by Toki Sangyo Co., Ltd.).

Recorded articles can be prepared by printing in a conventional manner by using the nonaqueous ink according to the present invention. For example, it is an inkjet printing process of printing an image by forming and ejecting microdroplets of ink reproducibly onto a desired area and fixing the droplets there. An inkjet recording apparatus described below can be used preferably in forming an image or a surface-coating layer by the inkjet printing process.

In the preferable inkjet recording method, the ink is energized, to form an image on an image-receiving material (e.g., ordinary papers, resin-coated papers, films, electrophotographic papers, clothes, glasses, metals, ceramics, inkjet papers, as described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597, and JP-A-10-337947). The method described in the paragraph Nos. 0093 to 0105 of JP-A-2003-306623 can be applied as the inkjet recording process preferably in the present invention.

In forming an image, a latex polymer compound may be used in combination for the purpose of providing glossiness or water resistance or improving the weather resistance. The timing of imparting the latex polymer to the image-receiving material may be before or after imparting the coloring agent or simultaneously with it. Accordingly, the site to which the latex polymer compound is added may be in the image-receiving paper or ink, or a liquid material composed of the latex polymer compound singly may be prepared and used. More specifically, the methods described in JP-A-2002-166638 (Japanese Patent Application No. 2000-363090), JP-A-2002-121440 (Japanese Patent Application No. 2000-315231), JP-A-2002-154201 (Japanese Patent Application No. 2000-354380), JP-A-2002-144696 (Japanese Patent Application No. 2000-343944), and JP-A-2002-80759 (Japanese Patent Application No. 2000-268952) can be preferably used.

An inkjet recording device is not particularly limited, and any known inkjet recording device that can achieve an intended resolution may be used. The inkjet recording device is equipped with, for example, an ink supply system, a temperature sensor, and an activating energy ray source. The ink supply comprises, for example, a main tank containing the ink composition or the surface coating composition of the present invention, a supply pipe, a supply tank immediately in front of an inkjet head, a filter, and a piezo system inkjet head. The piezo system inkjet head may be driven so as to discharge a multisize dot of preferably 1 to 100 pL, and more preferably 8 to 30 pL, at a resolution of preferably 320×320 to 4,000× 4,000 dpi, more preferably 400×400 to 1,600×1,600 dpi, and yet more preferably 720×720 dpi.

Since it is desirable for the radiation curing type ink to be discharged at a constant temperature, a section from the supply tank to the inkjet head is thermally insulated and heated. A method of controlling temperature is not particularly limited, but it is preferable to provide, for example, temperature sensors provided at a plurality of pipe section positions, and control heating according to the ink flow rate and the temperature of the surroundings. The temperature sensors may be provided on the supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

When the composition used in the inkjet recording apparatus is discharged using the above mentioned inkjet recording device, the ink composition and the surface coating composition are preferably discharged after being heated to preferably 25° C. to 80° C., and more preferably 25° C. to 50° C., so as to reduce the viscosity of the ink composition and the surface coating composition to preferably 3 to 15 m·Pas, and more preferably 3 to 13 mPa·s. In particular, it is preferable to use the ink composition and the surface coating composition having an ink viscosity at 25° C. of no more than 50 mPa·s since a good discharge stability can be obtained. By employing this method, high discharge stability can be realized.

The radiation curing type ink composition and the radiation curing type surface coating composition generally have a viscosity that is higher than that of a normal ink composition or an aqueous ink used for an inkjet recording ink, and variation in viscosity due to a change in temperature at the time of discharge is large. Viscosity variation in the composition has a large effect on changes in liquid droplet size and changes in liquid droplet discharge speed and, consequently, causes the image quality to be degraded. It is therefore necessary to maintain the composition discharge temperature as constant as possible. In the present invention, the control range for the temperature is preferably ±5° C. of a set temperature, more preferably ±2° C. of the set temperature, and yet more preferably ±1° C. of the set temperature.

The ink of the present invention discharged on a support or a color image can be cured by irradiating them with an activating energy ray. This is due to a radical, acidic, or basic initiating species being generated by decomposition of the polymerization initiator contained in the ink by irradiation with the activating energy ray, the initiating species functioning so as to make a polymerization reaction of a cationically-polymerizable compound take place and to promote it. In this process, if a sensitizing agent is present together with the polymerization initiator in the ink composition and the surface coating composition, the sensitizing agent in the system absorbs the activating energy ray, becomes excited, and promotes decomposition of the polymerization initiator by contact with the polymerization initiator, thus enabling a curing reaction with higher sensitivity to be achieved.

The activating energy ray used in this process may include $\alpha$-rays, $\gamma$-rays, an electron beam, X rays, UV rays, visible light, and IR rays as described above. Although it depends on the absorption characteristics of the sensitizing dye, the peak wavelength of the activating energy ray is, for example, preferably 200 to 600 nm, more preferably 300 to 450 nm, and still more preferably 350 to 420 nm. In the case where the activating energy ray is an low output activating energy ray having sufficient sensitivity, the activating energy ray is applied therefore so that the illumination intensity on the exposed surface is preferably 10 to 4,000 mW/cm$^2$, and more preferably 20 to 2,500 mW/cm$^2$.

As an activating energy ray source, a mercury lamp, a gas/solid laser, etc. are mainly used, and as a light sauce for UV photocuring ink for inkjet recording, a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected. Furthermore, light-emitting diodes (LED) and laser diodes (LD) may be used as the source of the activating energy ray. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, U.S. Pat. No. 6,084,250 discloses an LED that can emit the activating energy ray whose wavelength is centered between 300 nm and 370 nm. Furthermore, the other violet LED is available, and irradiation can be carried out with radiation of a different UV bandwidth. The activating energy ray source particularly preferable in the present invention is a UV-LED, and a UV-LED having a peak wavelength between 350 to 420 nm is particularly preferable. The maximum illumination intensity of the LED on a recording medium is preferably 10 to 2,000 mW/cm$^2$, more preferably 20 to 1,000 mW/cm$^2$, and particularly preferably 50 to 800 mJ/cm$^2$.

The ink of the present invention is preferably exposed to such the activating energy ray, for example, 0.01 to 120 sec., and more preferably 0.1 to 90 sec. Irradiation conditions and a basic method for irradiation with the activating energy ray are disclosed in JP-A-60-132767. Specifically, light sources are provided on both sides of a head unit that includes a composition discharge device, and the head unit and the light source are made to scan by a so-called shuttle system. The irradiation with the activating energy ray is carried out after a certain time (e.g. 0.01 to 0.5 sec., preferably 0.01 to 0.3 sec., and more preferably 0.01 to 0.15 sec.) has elapsed from when the liquid droplet has landed. By controlling the time from the liquid droplet landing to irradiation so as to be a minimum in this way, it becomes possible to prevent the liquid droplet that has landed on a support from spreading before being cured. Furthermore, since the ink can be exposed before it reaches a deep area of a porous support that the light source cannot reach, it is possible to prevent monomer from remaining unreacted. Furthermore, curing may be completed using the other light source that is not driven. WO99/54415 discloses, as an irradiation method, a method employing an optical fiber and a method in which a collimated light source is incident on a mirror surface provided on a head unit side face, and a recorded area is irradiated with UV light. Such the curing method can also be adopted in the present invention.

By employing such the method described above, it is possible to maintain a uniform dot diameter for landed ink even for various types of support having different surface wettability, thereby improving the image quality. In order to obtain a color image, it is preferable to superimpose colors in order from those with a low lightness. By superimposing inks in order from one with low lightness, it becomes easy for radiation to reach a lower ink, the curing sensitivity is good, the amount of residual monomer decreases, and an improvement in adhesion can be expected. Furthermore, although it is possible to discharge all colors and then expose them at the same time, it is preferable to expose one color at a time from the viewpoint of promoting curing. In this way, the ink composition and surface coating composition that can be used in present invention is cured by irradiation with the activating energy ray in high sensitivity to thus form an image on the surface of the support.

The present invention, which addresses solving problems of nonaqueous hardening inks, can provide a nonaqueous ink superior in hardening efficiency and ejecting stability, and capable of providing a superior transparency and abrasion resistance for the formed image. Furthermore, the present invention can provide an image-recording method, an image-recording apparatus and a recorded article by using the non-aqueous ink.

The present invention will be described in more detail based on the following examples, but the invention is not intended to be limited thereto. In the following examples, the terms "part(s)" and "%" are values by mass, unless otherwise specified.

EXAMPLES

Production of Magenta Pigment A

As a dispersant, 10 mass parts of polyvinylpyrolidone K25 (trade name, manufactured by Tokyo Kasei Kogyo Co., Ltd.) was dissolved in 80 mass parts of dimethylsulfoxide, and thereto 10 mass parts of a quinacridone pigment of C.I. PR122 was suspended in a flask at 25° C. under an atmosphere of the air. Then, thereto, 25% tetramethylammonium hydroxide methanol solution (manufactured by Wako Pure Chemical Industries, Ltd.) was added dropwise in small portions, for solubilization of the quinacridone pigment, to give a dark blue purple solution.

The pigment solution was stirred for 3 hours, and was poured rapidly to ion-exchange water (400 parts of the ion-exchange water with respect to 10 parts of the pigment: 5° C.) which was agitated with impeller-type stirring blades (800 rpm) and was kept to cool, by using two System Dispensers (manufactured by Musashi Engineering, Inc., needle internal diameter: 0.58 mm, discharging pressure: 4.0 kgf/cm$^2$), to give a transparent reddish aqueous pigment dispersion containing pigment-containing particles (colorant particles).

The average volume particle diameter of the aqueous pigment dispersion, as determined by the dynamic light scattering method, was 23.3 nm (TEM average particle diameter: 18.9 nm), and the ratio of volume-average particle diameter My/number-average particle diameter Mn, an indicator of monodispersibility, was 1.19.

Then, hydrochloric acid was added dropwise to the aqueous pigment dispersion to adjust pH to 7.0, the resultant dispersion was filtered through a membrane filter of average pore size 0.1 µm under a reduced pressure, and the residue was washed five times with ion-exchange water to remove the salt and solvent, to give a paste of the pigment-containing particle dispersion.

Then, 100 parts of ethyl lactate was added to the paste, followed by agitation and ultrasonication. The resultant mixture was then filtered through a membrane filter of average pore size 0.1 µm under a reduced pressure, and the residue paste was washed with ion-exchange water and filtered once again through a membrane filter of average pore size 0.1 µm under a reduced pressure, to give a paste of the pigment-containing particle dispersion. Then, the thus-obtained paste of the dispersion containing the pigment-containing particles was spray dried, to give a Magenta Pigment A.

Production of Magenta Pigment B

A Magenta Pigment B was obtained in the same manner as the Magenta Pigment A, except that C.I. PR122 was replaced with C.I. PV19.

Preparation of Magenta Pigment C

A Magenta Pigment C was obtained in the same manner as the Magenta Pigment A, except that C.I. PR122 was replaced with 5 mass parts of C.I. PR122 and 5 mass parts of C.I. PV19.

Preparation of Magenta Pigment D

A Magenta Pigment D was obtained in the same manner as the Magenta Pigment A, except that C.I. PR122 and ethyl lactate were replaced with C.I. PR202 and methanol, respectively.

Preparation of Magenta Pigment E

A Magenta Pigment E was obtained in the same manner as the Magenta Pigment A, except that the agitation and ultrasonication by using ethyl lactate were not conducted.

Preparation of Magenta Pigment F

A Magenta Pigment F was obtained in the same manner as the Magenta Pigment A, except that the agitation and ultrasonication by using ethyl lactate were changed to agitation treatment at 50° C. for 1 hour by using a 25% aqueous methanol solution.

Preparation of Magenta Pigment H

A Magenta Pigment H was obtained in the same manner as the Magenta Pigment A, except that the spray drying was replaced with drying under heating at 100° C.

Preparation of Magenta Pigment I

A Magenta Pigment I was obtained in the same manner as the Magenta Pigment A, except that 10 mass parts of polyvinylpyrrolidone was not used.

Preparation of Cyan Pigment A

As a dispersant, 10 mass parts of polyvinylpyrrolidone K25 (trade name, manufactured by Tokyo Kasei Kogyo Co., Ltd.), and 10 mass parts of a phthalocyanine pigment of C.I. PB15:3 were dissolved in 80 mass parts of a mixed liquid of methanesulfonic acid and formic acid in a flask at 25° C., under an atmosphere of the air, to give a pigment solution.

The pigment solution was stirred for 3 hours, and added rapidly to ion-exchange water (400 parts of ion-exchange water with respect to 10 parts of pigment, at 5° C.), which was stirred with impeller-type stirring blades (800 rpm) and was kept to cool, by using two System Dispensers (manufactured by Musashi Engineering, Inc., needle internal diameter: 0.58 mm, discharging pressure: 4.0 kgf/cm$^2$), to give a transparent bluish aqueous pigment dispersion containing pigment-containing particles (colorant particles).

Then, sodium hydroxide was added dropwise to the aqueous pigment dispersion to adjust the pH to 7.0, the resultant mixture was filtered through a membrane filter of average pore size 0.1 μm under a reduced pressure, and the residue was washed five times with ion-exchange water to remove the salt and solvent, to give a paste of the dispersion of pigment-containing particles.

Then, 100 parts of methanol was added to the paste, followed by stirring and ultrasonication. The resultant mixture was then filtered through a membrane filter of average pore size 0.1 μm under a reduced pressure, and the residue paste was washed with ion-exchange water and filtered once again through a membrane filter of average pore size 0.1 μm under a reduced pressure, to give a paste of the dispersion containing pigment-containing particles. The paste of the dispersion containing pigment-containing particles thus obtained was then spray-dried, to give a Cyan Pigment A.

Preparation of Cyan Pigment B

A Cyan Pigment B was obtained in the same manner as the Cyan Pigment A, except that 10 mass parts of polyvinylpyrrolidone was replaced with 5 mass parts of polyvinylpyrrolidone.

Preparation of Yellow Pigment A

A Yellow Pigment A was obtained in the same manner as the Magenta Pigment A, except that C.I. PR122 was replaced with C.I. PY128.

Preparation of Yellow Pigment B

A Yellow Pigment B was obtained in the same manner as the Magenta Pigment A, except that C.I. PR122 was replaced with C.I. PY74.

Preparation of Yellow Pigment C

A Yellow Pigment C was obtained in the same manner as the Yellow Pigment A, except that 10 parts by mass of polyvinylpyrolidone was not used.

Materials (each trade name) for preparing the ink used are as follows.
(Dispersant)
  Solsperse 32000 (manufactured by Noveon)
  Solsperse 36000 (manufactured by Noveon)
(Monomer)
  Rapi-Cure DVE-3 (triethylene glycol divinyl ether, manufactured by ISP)
  OXT-221 (manufactured by Toagosei Co., Ltd.)
  Cylacure UVR 6105 (manufactured by Dow Chemical)
  OXT-212 (manufactured by Toagosei Co., Ltd.)
  Rapi-cure CHMVE (manufactured by ISP)
(Polymerization Initiator)
  CPI-100P (sulfonium salt, manufactured by San-Apro Ltd.)
(Sensitizer)
  9,10-dibutoxyanthracene (manufactured by Kawasaki Kasei Chemicals Ltd.)
(Surfactant)
  BYK307 (manufactured by BYK Chemie)

Preparation of Magenta Millbases a to F, H, and I 300 mass parts of any of the thus-obtained Magenta Pigments A to F, H, and I, 600 mass parts of OXT 212 (trade name), and 150 mass parts of Solsperse 32000 (trade name, manufactured by Noveon) were agitated and blended in a dispersing machine Motormill M50 (manufactured by Eiger) by using 0.05-mm zirconia beads at a peripheral speed of 9 m/s, to give Magenta Millbases A to F, H, and I, respectively. The Magenta Millbases A to F were obtained by dispersing for 6 hours, while the Magenta Millbases H and I for 10 hours.

Preparation of Magenta Millbase G

A Magenta Millbase G was obtained in the same manner as the Magenta Millbase A, except that the magenta pigment was replaced with C.I. PR122 used in the production of the Magenta Pigment A and that the time period for dispersion was changed to 16 hours.

Preparation of Cyan Millbases a and B

Cyan Millbases A and B were obtained in the same manner as the Magenta Millbase A, except that the magenta pigment was replaced with the Cyan Pigments A and B, respectively, and that the time period for dispersion was changed to 4 hours.

Preparation of Cyan Millbase C

A Cyan Millbase C was obtained in the same manner as the Magenta Millbase A, except that the magenta pigment was replaced with PB15:3 used in the production of the Cyan Pigment A, and that the time period for dispersion was changed to 12 hours.

Preparation of Yellow Millbases A to C

Yellow Millbases A to C were obtained in the same manner as the Magenta Millbase A, except that the magenta pigment was replaced with the Yellow Pigments A to C, respectively. The Yellow Millbases A and B were obtained by dispersing for 6 hours, while the Yellow Millbase C for 10 hours.

Preparation of Yellow Millbase D

A Yellow Millbase D was obtained in the same manner as the Magenta Millbase A, except that the magenta pigment was replaced with C.I. PY74 used in the production of the Yellow Pigment B, and that the time period for dispersion was changed to 10 hours.

Example 1

The Magenta Millbase A obtained above and the components for the following ink composition were mixed in a high-speed ice-cooled stirrer. The resultant mixture was filtered through a 5-μm membrane filter, to give a Magenta Ink A.
(Composition of Ink)

| Composition | Addition amount (mass part) |
|---|---|
| Magenta Millbase A | 12.0 |
| OXT-221 | 11.0 |
| UVR6105 | 11.9 |
| OXT-211 | 52.0 |
| CPI-100P | 12.0 |
| 9,10-dibutoxyanthracene | 1.0 |
| BYK307 | 0.1 |

Examples 2 to 6

Magenta Inks B to F were obtained in the same manner as in Example 1, except that the Magenta Millbase A was replaced with any of the Magenta Millbases B to F, respectively.

Comparative Examples 1 to 3

Magenta Inks G to I were obtained in the same manner as in Example 1, except that the Magenta Millbase A was replaced with any of the Magenta Millbases G to I, respectively.

Example 7

The Cyan Millbase A obtained above and the components for the following ink composition were mixed in a high-speed ice-cooled stirrer. The resultant mixture was filtered through a 5-μm membrane filter, to give a Cyan Ink A.
(Ink Composition of Cyan Color)
(Composition of Ink)

| Composition | Addition amount (mass part) |
|---|---|
| Cyan Millbase A | 6.0 |
| OXT-221 | 11.0 |
| UVR6105 | 9.9 |
| OXT-211 | 60.0 |
| CPI-100P | 12.0 |
| 9,10-dibutoxyanthracene | 1.0 |
| BYK307 | 0.1 |

Example 8

A Cyan Ink B was obtained in the same manner as in Example 7, except that the Cyan Millbase A was replaced with the Cyan Millbase B.

Comparative Example 4

A Cyan Ink C was obtained in the same manner as in Example 7, except that the Cyan Millbase A was replaced with the Cyan Millbase C.

Example 9

The Yellow Millbase A obtained above and the components for the following ink composition were mixed in a high-speed ice-cooled stirrer. The resultant mixture was filtered through a 5-μm membrane filter, to give a Yellow Ink A.
(Composition of Ink)

| Composition | Addition amount (mass part) |
|---|---|
| Yellow Millbase A | 12.0 |
| OXT-221 | 11.0 |
| UVR6105 | 11.9 |
| OXT-211 | 52.0 |
| CPI-100P | 12.0 |
| 9,10-dibutoxyanthracene | 1.0 |
| BYK307 | 0.1 |

Example 10

A Yellow Ink B was obtained in the same manner as in Example 9, except that the Yellow Millbase A was replaced with the Yellow Millbases B.

Comparative Examples 5 and 6

Yellow Inks C and D were obtained in the same manner as in Example 9, except that the Yellow Millbase A was replaced with the Yellow Millbases C and D, respectively.
(Determination of the Average Particle Diameter $D_{50}$ and $\Delta D$ ($D_{90}-D_{10}$) of Pigment Particles in Ink)

Each ink above was analyzed by using FPAR-1000 (trade name) manufactured by Otsuka Electronics Co., Ltd., to measure the mass-average particle diameter and the number-average particle diameter of the colorant particles in the ink. Then, values of $D_{90}$, $D_{50}$, and $D_{10}$ were determined, which represent the particle diameters at the points where the integrated values of the number of colorant particles in the particle diameter distribution be 0.9 (90% in number to the total particle number), 0.5 (50% in number to the total particle number) and 0.1 (10% in number to the total particle number), respectively; and $\Delta D$ ($D_{90}-D_{10}$) was calculated from the resultant $D_{90}$ and $D_{10}$ values.

<Inkjet Image Recording Method>

Then, an image was formed on a recording medium, by using an inkjet recording test apparatus equipped with piezoelectric inkjet nozzles. The ink-supplying system had a stock tank, a supplying pipe, an ink-supplying tank immediately in front of the inkjet head, a filter, and a piezoelectric inkjet head, and the region from the ink-supplying tank to the inkjet head was insulated and heated. Temperature sensors were installed on the ink-supplying tank and the region close to the nozzles of the inkjet head, and the temperature was controlled to make the nozzle region always at a temperature of 45° C.±2° C. The piezoelectric inkjet head was operated under the condition of 8 to 30 pl of multi-sized dots being ejected at a resolution of 720×720 dpi. The light irradiation (exposure) system, the main scanning speed, and the injection frequency were adjusted in such a manner that UV ray was focused onto the exposure face at an illuminance of 1,000 mW/cm² after ink deposition and that irradiation be initiated, 0.1 second after deposition of the ink on the recording medium. The ultraviolet ray lamp utilized was HAN250NL Highcure mercury lamp (manufactured by GS Yuasa Corp.). The term "dpi" as referred to herein, means the number of dots per 2.54 cm. The substrate utilized was a polyethylene terephthalate film.
(Image Printing)

A solid image was outputted by four passes in the above-mentioned inkjet recording apparatus equipped with a piezoelectric head, at a resolution of 720 dpi×720 dpi, a maximum ink droplet quantity of 12 pl/pixel, a maximum ink deposition quantity in said solid image of 8.9 g/m², and an output density of 100%. The substrate utilized was a polyethylene terephthalate film. The flow rate of the external air on the surface of the substrate was controlled to less than 1 m/s.

(1. Evaluation of Image by Touching with Finger)

The state of the cured image thus obtained in the above was evaluated with touching with the finger, according to the following evaluation criteria:

~Evaluation Criterion~

4: Very favorable, with no image deformation observed even after touching with the finger;

3: No image deformation observed, but with some tackiness observed, after touching with the finger;

2: Image deformation observed, with some tackiness observed, after touching with the finger; and 1: Image deformation observed, after touching with the finger.

The results of evaluation are shown in Table 1.

(2. Evaluation of Discharging Stability)

Each ink was discharged continuously for 24 hours in the inkjet recording apparatus above, and a solid image was outputted onto a polyethylene terephthalate film at an output density of 100%. The number of white streaks occurred on the solid image obtained was counted, and the discharging stability of the ink was evaluated, according to the following criteria:

~Evaluation Criterion~

3: No occurrence of white streaks that means a non-printed region at all, all over the printed surface;

2: Occurrence of white streaks observed slightly; and

1: Occurrence of many white streaks observed all over the printed surface, which means non-allowable quality level in the practice.

The results of evaluation are shown in Table 1.

(3. Evaluation of Abrasion Resistance of Image)

The image thus prepared was rubbed with a folded tissue paper, and the abrasion resistance of the image was evaluated, according to the following criteria:

~Evaluation Criterion~

3: Almost no peeling of image observed after the rubbing test;

2: Partial peeling of image observed after the rubbing test; and

1: Almost completely peeled-off image observed after the rubbing test.

The results of evaluation are shown in Table 1.

The results above show that the ink properties of the ink of the present invention, in which the average diameter of the pigment fine-particles in ink is less than 50 nm and the value of $D_{90}-D_{10}$ is 100 nm or less, are remarkably improved, as compared to the inks for comparison containing pigment fine-particles falling outside of the specific range above.

(Evaluation of Superimposed Image)

Using the inkjet recording apparatus described above, an ink was supplied to form a solid image of the yellow ink C, and another ink was ejected to deposit thereon to form a solid image of said another ink, as shown in Table 2. Then, the thus-formed superimposed image was irradiated with UV ray, to record the image. The output voltage was controlled properly to make the irradiation illuminance of the ultraviolet ray 800 mW/cm².

(4. Evaluation of Transparency)

The image thus obtained was evaluated with the naked eye, according to the following evaluation criteria:

~Evaluation Criterion~

3: Yellowish background color development was favorable, and a high-density brilliant image in secondary color was obtained;

2: Yellowish background color development seems to thin, and color development of the image in secondary color was insufficient; and 1: Yellowish background color development was thin.

The results of evaluation are shown in Table 2.

(5. Evaluation of Ink Curability)

The image thus obtained was observed with the naked eye, and the ink curability was evaluated, according to the following criteria:

~Evaluation Criterion~

3: No intercolor blurring at the boundary of colors observed;

2: Some blurring of colors at the boundary and mixing of colors in a width of several mm observed; and 1: Extensive blurring of colors observed at the boundary and also colors of respective solid images mixed.

The results of evaluation are shown in Table 2.

(6. Evaluation of Abrasion Resistance of Image)

The image formed with each ink described above was rubbed with a folded tissue paper, and the abrasion resistance of the image was evaluated, according to the following criteria:

TABLE 1

| Ink | | Average particle diameter (nm) | $D_{90}-D_{10}$ (nm) | 1. Evaluation of image by touching with finger | 2. Discharging stability | 3. Abrasion resistance |
|---|---|---|---|---|---|---|
| Magenta Ink A | Example | 19.2 | 33.5 | 4 | 3 | 3 |
| Magenta Ink B | Example | 26.5 | 40.8 | 4 | 3 | 3 |
| Magenta Ink C | Example | 35.1 | 46.0 | 4 | 3 | 3 |
| Magenta Ink D | Example | 45.1 | 47.6 | 4 | 3 | 3 |
| Magenta Ink E | Example | 27.2 | 38.5 | 4 | 3 | 3 |
| Magenta Ink F | Example | 49.1 | 90.3 | 3 | 3 | 3 |
| Magenta Ink G | Comparative Example | 113.5 | 136.3 | 1 | 1 | 1 |
| Magenta Ink H | Comparative Example | 54.3 | 94.1 | 2 | 2 | 2 |
| Magenta Ink I | Comparative Example | 53.8 | 111.5 | 1 | 2 | 2 |
| Cyan Ink A | Example | 24.0 | 42.4 | 4 | 3 | 3 |
| Cyan Ink B | Example | 43.1 | 79.1 | 4 | 3 | 3 |
| Cyan Ink C | Comparative Example | 59.6 | 92.9 | 2 | 2 | 2 |
| Yellow Ink A | Example | 19.8 | 41.2 | 4 | 3 | 3 |
| Yellow Ink B | Example | 46.2 | 75.2 | 4 | 3 | 3 |
| Yellow Ink C | Comparative Example | 70.1 | 94.9 | 2 | 2 | 2 |
| Yellow Ink D | Comparative Example | 109.3 | 151.3 | 1 | 1 | 1 |

~Evaluation Criterion~

3: Almost no peeling of image observed after the rubbing test;

2: Partial peeling of image observed after the rubbing test; and

1: Almost completely peeled-off image observed after the rubbing test.

The results of evaluation are shown in Table 2.

TABLE 2

| Ink | | Average particle diameter (nm) | $D_{90}$-$D_{10}$ (nm) | 4. Transparency | 5. Ink curability | 6. Abrasion resistance |
|---|---|---|---|---|---|---|
| Magenta Ink A | Example | 19.2 | 33.5 | 3 | 3 | 3 |
| Magenta Ink C | Example | 35.1 | 46.0 | 3 | 3 | 3 |
| Magenta Ink D | Example | 45.1 | 47.6 | 3 | 3 | 3 |
| Magenta Ink E | Example | 27.2 | 38.5 | 3 | 3 | 3 |
| Magenta Ink H | Comparative Example | 54.3 | 94.1 | 1 | 2 | 2 |
| Magenta Ink I | Comparative Example | 53.8 | 111.5 | 1 | 1 | 1 |
| Cyan Ink A | Example | 24.0 | 42.4 | 3 | 3 | 3 |
| Cyan Ink B | Example | 43.1 | 79.1 | 3 | 3 | 3 |
| Cyan Ink C | Comparative Example | 59.6 | 92.9 | 1 | 2 | 2 |

The results above show that the ink properties of the ink of the present invention, in which the average diameter of the pigment fine-particles in ink is less than 50 nm and the value of $D_{90}$–$D_{10}$ is 100 nm or less, are remarkably improved, as compared to the inks for comparison containing pigment fine-particles falling outside of the specific range above.

(X-Ray Diffraction Measurement)

RINT 2500 (Trade Name, Manufactured by Rigaku Corp.) was utilized, for the following X-ray diffraction measurement.

The Magenta Pigments A and E used in the magenta inks of the above examples were analyzed by X-ray diffraction with RINT 2500, manufactured by Rigaku Corp. The X-ray diffraction measurement was carried out by using a copper target and Cu—K$\alpha$1 line.

The crystallite diameter of each of the pigment particles was calculated from the spectrum obtained, and it was observed that the crystallite diameter of the colorant particles of the Magenta Pigment A was 9.7±2 nm (97±20 Å) and that a halo was observed in the spectrum of the Magenta Pigment sample E at the region of 2θ in the range of 4° to 70°.

The Magenta Pigment C, Magenta Pigment D, Cyan Pigment A, and Cyan Pigment B were subjected to the X-ray diffraction measurement in the same manner as above, and the results showed that the crystallite diameters thereof are 19.4±2 nm (194±20 Å), 23.8±2 nm (238±20 Å), 10.4±2 nm (104±20 Å), and 22.6±2 nm (226±20 Å), respectively. From those results, it is understood that the pigment fine-particles contained in the Magenta Inks A, C, and D and Cyan Inks A and B each had a crystalline structure.

(Evaluation of Fastness to Light)

Each of the recorded articles obtained in the above examples was placed in a fademeter, followed by irradiation at an illuminance of 170,000 lux with a xenon lamp for 4 days, to conduct tests on fastness to light. The printed article prepared by using the Magenta Ink E containing the colorant particles showing halo in the X ray diffraction measurement, was observed with the naked eye that this article was faded slightly, as compared to the printed articles prepared by using the Magenta Inks A, C, and D and Cyan Inks A and B, respectively. On the other hand, especially the Magenta Ink C was observed with the naked eye that this article was higher in color density and showed favorable color development.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2009-088229 filed in Japan on Mar. 31, 2009, which is entirely herein incorporated by reference.

What I claim is:

1. A nonaqueous ink, comprising:
colorant particles, the colorant particles having an average particle diameter of 1 nm or more and less than 50 nm, and the value ($D_{90}$-$D_{10}$) of being 100 nm or less,
a dispersant; and
a cationically-polymerizable compound;
wherein $D_{90}$-$D_{10}$ is a value obtained by subtracting $D_{10}$ from $D_{90}$, $D_{90}$ and $D_{10}$ represent respectively the particle diameters at cumulative colorant particle numbers of 0.9 (90 number %) and 0.1 (10 number %) in an integral value of the distribution function dG=F(D)dD; and G represents the number of the pigment particles; and D represents the diameter of the particles,
wherein the colorant particles comprise quinacridone pigment particles or azo pigment particles,
wherein the colorant particles have a crystalline structure as determined by a powder X-ray diffraction analysis, such that the colorant particles do not show a halo specific to an amorphous substance, and wherein the crystallite diameter of the colorant particles is 5 nm or more, and
wherein the cationically-polymerizable compound is at least one cationically-polymerizable compound selected from the group consisting of an oxetane compound, an oxirane compound and a vinyl ether compound,
said nonaqueous ink prepared by a process which comprises the steps of:
providing a colorant solution and an aqueous medium, in which a dispersant is contained in at least one of the colorant solution and the aqueous medium;
bringing the colorant solution and the aqueous medium into contact each other, and thereby precipitating the colorant as fine particles;
removing the fine particles in an agglomerate form; and
bringing the removed colorant agglomerates into contact with an organic medium.

2. The nonaqueous ink according to claim 1, wherein the dispersant is a polymer compound.

3. The nonaqueous ink according to claim 1, further comprising a cationic polymerization initiator.

4. The nonaqueous ink according to claim 1, wherein the nonaqueous ink is an inkjet recording ink.

5. An ink set comprising a plurality of inks, wherein at least one of the inks is the ink according to claim 1.

6. An image-forming method, comprising: a step of recording an image by using the nonaqueous ink according to claim 1.

7. The nonaqueous ink according to claim 1, wherein the agglomerates are formed by treating the precipitated fine particles with acid.

8. The nonaqueous ink according to claim 1, wherein the colorant fine particles are precipitated in the following condition. A or B:
A: The colorant solution is introduced via a supplying tube into the stirred aqueous medium.
B: The colorant solution and the aqueous medium are contacted in the term of passing a channel.

9. An image-forming apparatus, comprising a storage unit containing the nonaqueous ink according to claim 1; and an image-forming unit; whereby an image of the nonaqueous ink is recorded on a material with the image-forming unit.

10. The nonaqueous ink according to claim 1, wherein the colorant particles comprise quinacridone pigment particles, and the quinacridone pigment is selected from the group consisting of CIPR122, CIPR202 and CIPV19.

11. The nonaqueous ink according to claim 1, wherein the colorant particles comprise azo pigment particles, and the azo pigment is selected from the group consisting of CIPY74 and CIPY128.

12. The nonaqueous ink according to claim 1, wherein the cationically-polymerizable compound comprises an oxetane compound represented by Formula (2):

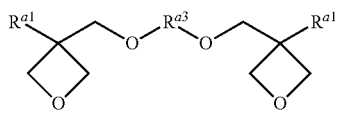
(2)

wherein $R^{a1}$ represents a hydrogen atom, an alkyl group having 1 to 6 carbon atoms, a fluoroalkyl group having 1 to 6 carbon atoms, an allyl group, an aryl group, a furyl group or a thienyl group, with the proviso that $R^{a3}$ is a silicon-containing linking group represented by the following formula:

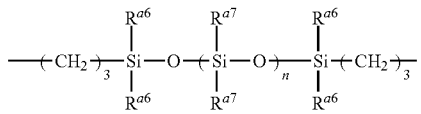

wherein $R^{a6}$ represents an alkyl group having 1 to 4 carbon atoms or an aryl group; n represents an integer of 0 to 2,000; and $R^{a7}$ represents an alkyl group having 1 to 4 carbon atoms, an aryl group, or a monovalent group having the following structure:

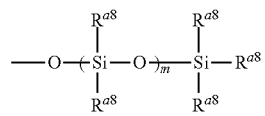

wherein $R^{a8}$ represents an alkyl group having 1 to 4 carbon atoms or an aryl group; and m is an integer of 0 to 100.

13. The nonaqueous ink according to claim 1, wherein the cationically-polymerizable compound comprises an oxetane compound represented by Formula (4):

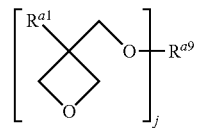
(4)

wherein $R^{a1}$ represents a hydrogen atom, an alkyl group having 1 to 6 carbon atoms, a fluoroalkyl group having 1 to 6 carbon atoms, an allyl group, an aryl group, a furyl group or a thienyl group; $R^{a9}$ is a polyvalent connecting group; and j is 3 or 4.

14. The nonaqueous ink according to claim 1, wherein the cationically-polymerizable compound comprises an oxetane compound represented by Formula (5):

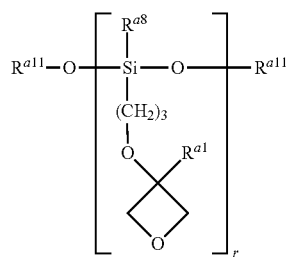
(5)

wherein $R^{a1}$ represents a hydrogen atom, an alkyl group having 1 to 6 carbon atoms, a fluoroalkyl group having 1 to 6 carbon atoms, an allyl group, an aryl group, a furyl group or a thienyl group; $R^{a8}$ represents an alkyl group having 1 to 4 carbon atoms or an aryl group; $R^{a11}$ represents an alkyl group having 1 to 4 carbon atoms; and r is 1 to 4.

* * * * *